(12) United States Patent
Yoshikawa et al.

(10) Patent No.: US 10,332,519 B2
(45) Date of Patent: Jun. 25, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Kiyoshi Yoshikawa, Saitama (JP); Atsushi Okubo, Tokyo (JP); Ken Miyashita, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/529,580

(22) PCT Filed: Mar. 9, 2016

(86) PCT No.: PCT/JP2016/001296
§ 371 (c)(1),
(2) Date: May 25, 2017

(87) PCT Pub. No.: WO2016/163068
PCT Pub. Date: Oct. 13, 2016

(65) Prior Publication Data
US 2017/0330569 A1 Nov. 16, 2017

(30) Foreign Application Priority Data
Apr. 7, 2015 (JP) .................................. 2015-078328

(51) Int. Cl.
G06F 3/01 (2006.01)
G06F 3/16 (2006.01)
G10L 15/22 (2006.01)
G10L 15/25 (2013.01)

(52) U.S. Cl.
CPC .............. *G10L 15/25* (2013.01); *G06F 3/011* (2013.01); *G06F 3/017* (2013.01); *G06F 3/16* (2013.01); *G06F 3/167* (2013.01); *G10L 15/22* (2013.01); *G10L 2015/227* (2013.01)

(58) Field of Classification Search
None
See application file for complete search history.

(56) References Cited

U.S. PATENT DOCUMENTS

| | | | | |
|---|---|---|---|---|
| 4,961,177 A | * | 10/1990 | Uehara | G07C 9/00158 340/5.52 |
| 6,283,860 B1 | * | 9/2001 | Lyons | A63F 13/06 434/367 |
| 2004/0130442 A1 | * | 7/2004 | Breed | B60C 11/24 340/443 |
| 2005/0027530 A1 | * | 2/2005 | Fu | G06K 9/6293 704/256 |

(Continued)

FOREIGN PATENT DOCUMENTS

JP 2011-041096 2/2011

OTHER PUBLICATIONS

Nov. 16, 2018, European Communication issued for related EP application No. 16714027.6.

*Primary Examiner* — Thuykhanh Le
(74) *Attorney, Agent, or Firm* — Paratus Law Group, PLLC

(57) ABSTRACT

An apparatus including circuitry configured to determine a position of a mouth of a user that is distinguishable among a plurality of people, and control an acquisition condition for collecting a sound based on the determined position of the user's mouth.

19 Claims, 17 Drawing Sheets

(56) References Cited

U.S. PATENT DOCUMENTS

| | | | |
|---|---|---|---|
| 2006/0025897 A1* | 2/2006 | Shostak | B60C 23/005 701/1 |
| 2008/0170472 A1* | 7/2008 | Yonak | G01S 5/18 367/129 |
| 2008/0199024 A1* | 8/2008 | Nakadai | H04R 3/005 381/92 |
| 2009/0052747 A1* | 2/2009 | Kamiyama | G06K 9/00281 382/118 |
| 2009/0110225 A1* | 4/2009 | Kim | H04R 1/406 381/356 |
| 2009/0196467 A1* | 8/2009 | Okubo | G06K 9/00288 382/118 |
| 2010/0277579 A1* | 11/2010 | Cho | G06K 9/00335 348/61 |
| 2010/0329544 A1* | 12/2010 | Sabe | G06K 9/00288 382/159 |
| 2011/0085061 A1* | 4/2011 | Kim | H04N 5/232 348/240.99 |
| 2011/0317006 A1* | 12/2011 | Kuboyama | G06K 9/0057 348/140 |
| 2011/0317917 A1* | 12/2011 | Free | G06K 9/00234 382/167 |
| 2012/0008802 A1* | 1/2012 | Felber | H03G 3/24 381/107 |
| 2012/0065973 A1* | 3/2012 | Cho | G10L 21/00 704/246 |
| 2012/0113211 A1* | 5/2012 | Yi | H04N 7/14 348/14.07 |
| 2012/0158432 A1* | 6/2012 | Jain | G06Q 50/24 705/3 |
| 2013/0030811 A1* | 1/2013 | Olleon | B60K 35/00 704/267 |
| 2013/0035901 A1* | 2/2013 | Breed | B60C 11/24 702/188 |
| 2013/0124209 A1* | 5/2013 | Yamada | G06K 9/00335 704/275 |
| 2013/0156198 A1* | 6/2013 | Kim | H04R 1/323 381/17 |
| 2013/0169827 A1* | 7/2013 | Santos | H04N 5/23229 348/207.1 |
| 2013/0211976 A1* | 8/2013 | Breed | G06Q 10/06 705/28 |
| 2013/0267194 A1* | 10/2013 | Breed | H04W 4/90 455/404.2 |
| 2014/0088966 A1* | 3/2014 | Harada | G10L 25/78 704/246 |
| 2014/0122086 A1* | 5/2014 | Kapur | G06F 3/017 704/275 |
| 2014/0297257 A1* | 10/2014 | Shin | G06F 17/289 704/3 |
| 2014/0328487 A1* | 11/2014 | Hiroe | G10L 21/0272 381/56 |
| 2014/0350924 A1* | 11/2014 | Zurek | G10L 15/22 704/231 |
| 2014/0372129 A1* | 12/2014 | Tzirkel-Hancock | H04R 3/005 704/278 |
| 2015/0003623 A1* | 1/2015 | Rasmussen | G10K 11/002 381/71.6 |
| 2015/0003634 A1* | 1/2015 | Yliaho | H04M 1/72522 381/103 |
| 2015/0117652 A1* | 4/2015 | Sato | G10L 21/0216 381/56 |
| 2015/0161992 A1* | 6/2015 | Jung | G10L 15/083 704/251 |
| 2015/0258942 A1* | 9/2015 | Kawamata | B60R 11/0247 381/86 |
| 2015/0279364 A1* | 10/2015 | Krishnan | G10L 15/25 704/251 |
| 2015/0310857 A1* | 10/2015 | Habets | G10L 25/78 704/240 |
| 2016/0039356 A1* | 2/2016 | Talwar | H04R 3/00 381/86 |
| 2016/0111109 A1* | 4/2016 | Tsujikawa | H04R 3/005 704/226 |
| 2016/0111113 A1* | 4/2016 | Cho | G10L 21/0208 704/250 |
| 2016/0117592 A1* | 4/2016 | Jung | G06Q 30/02 706/12 |
| 2016/0136516 A1* | 5/2016 | Hooke | A63F 13/213 463/34 |
| 2016/0249132 A1* | 8/2016 | Oliaei | H04R 1/406 |

* cited by examiner

[Fig. 1]
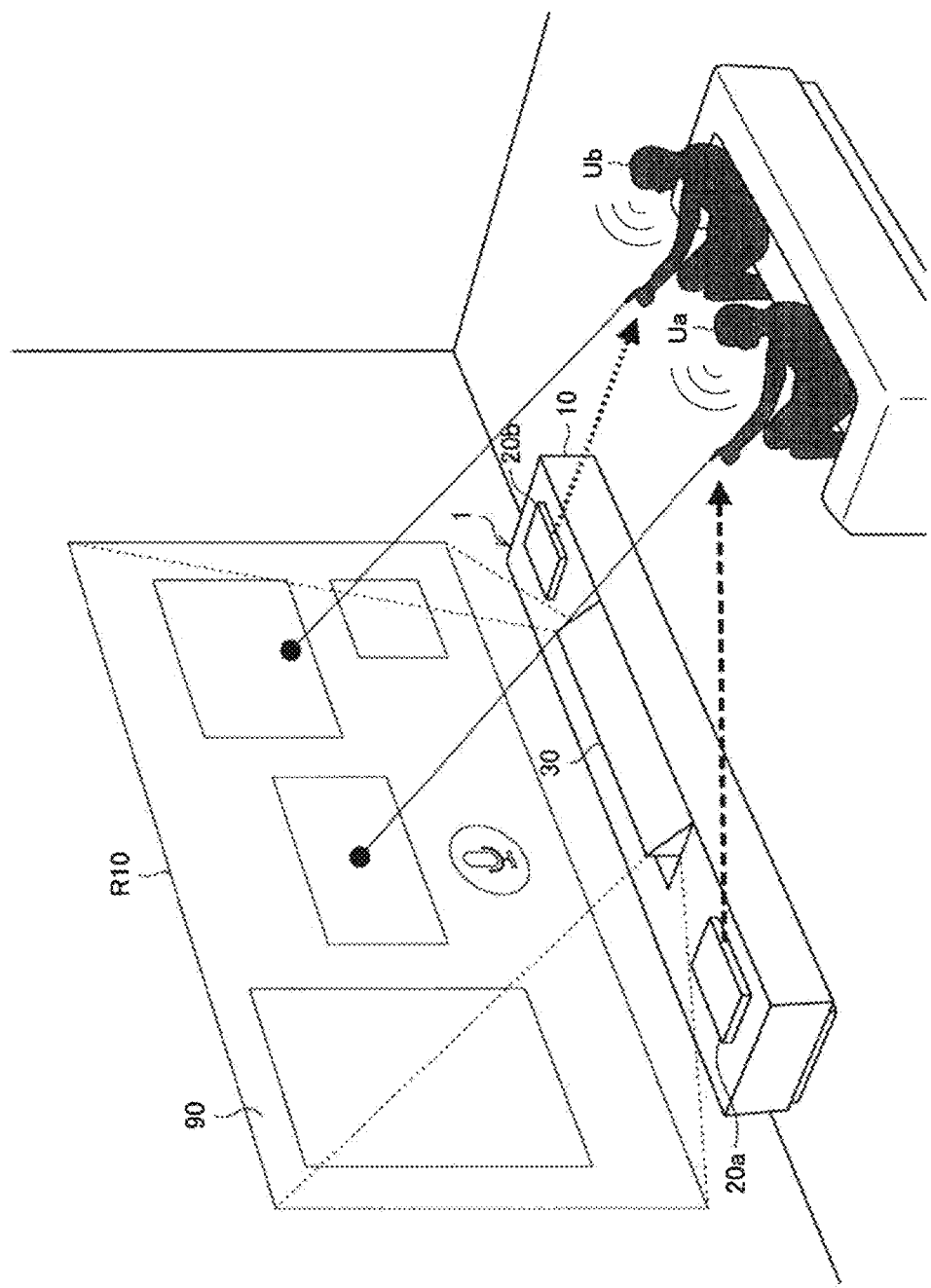

[Fig. 2]
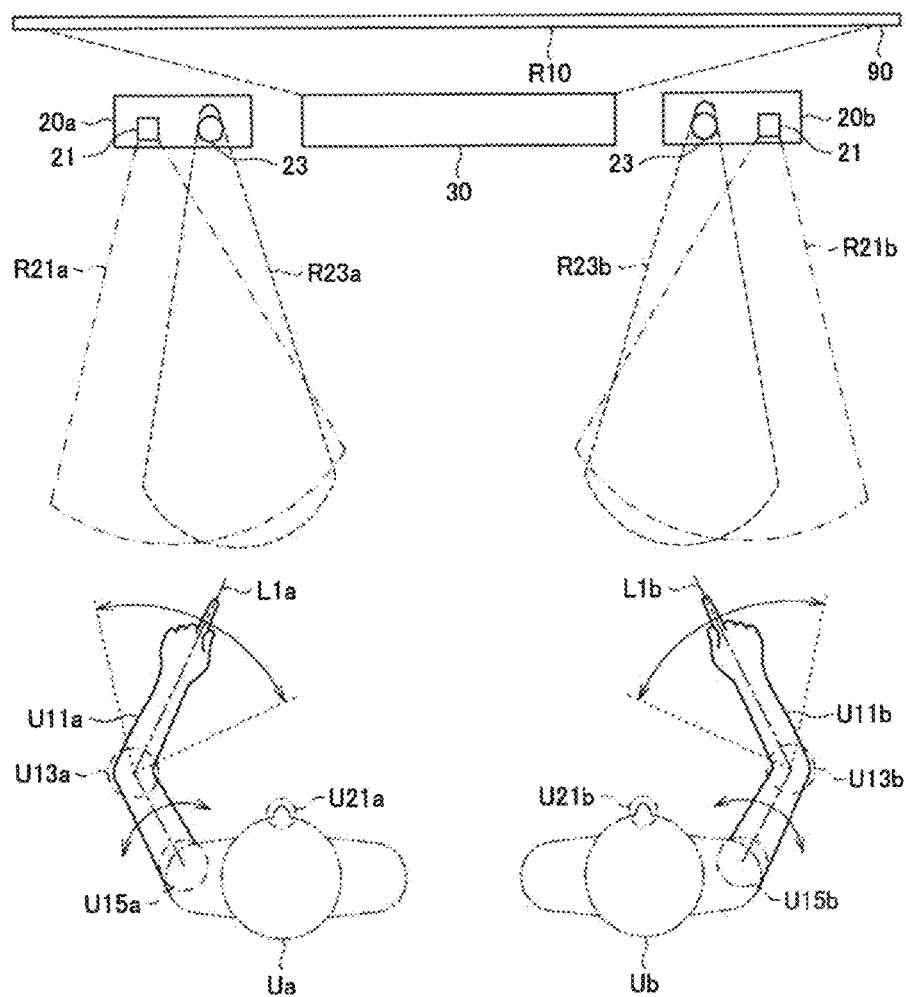

[Fig. 3]

[Fig. 4]
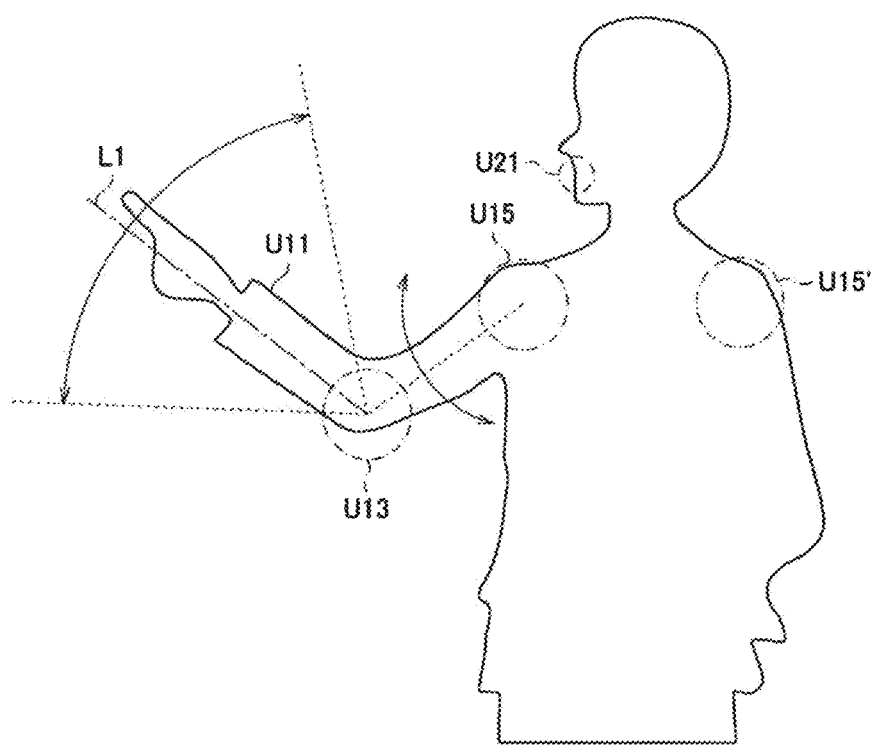

[Fig. 5]
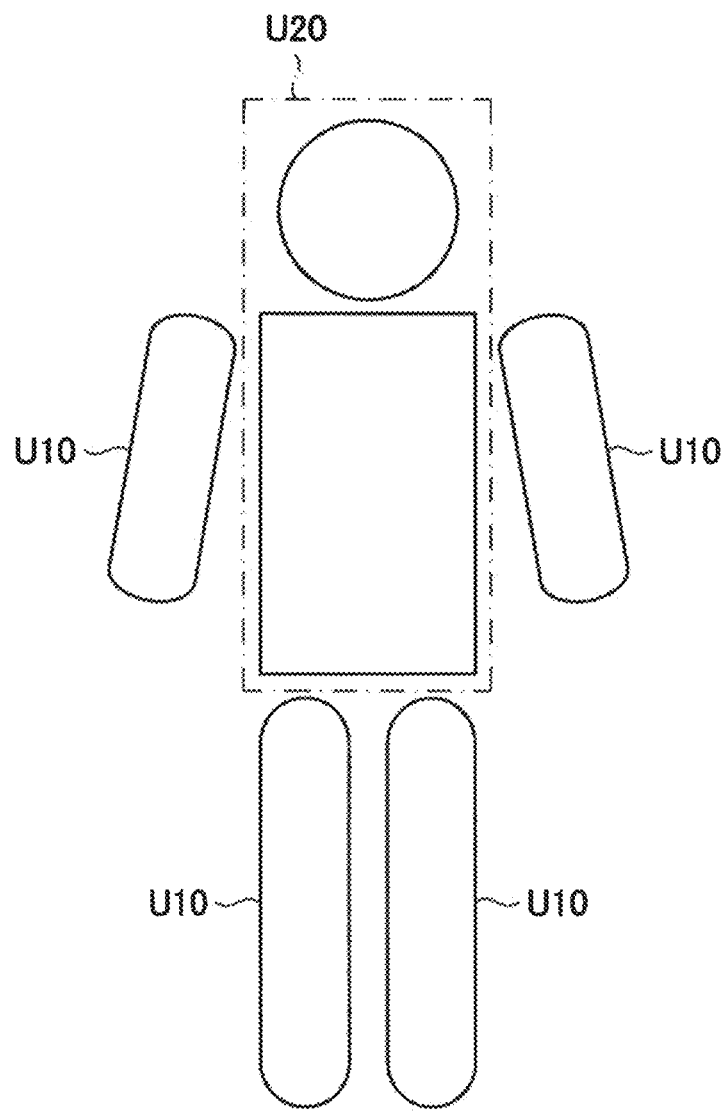

[Fig. 6]
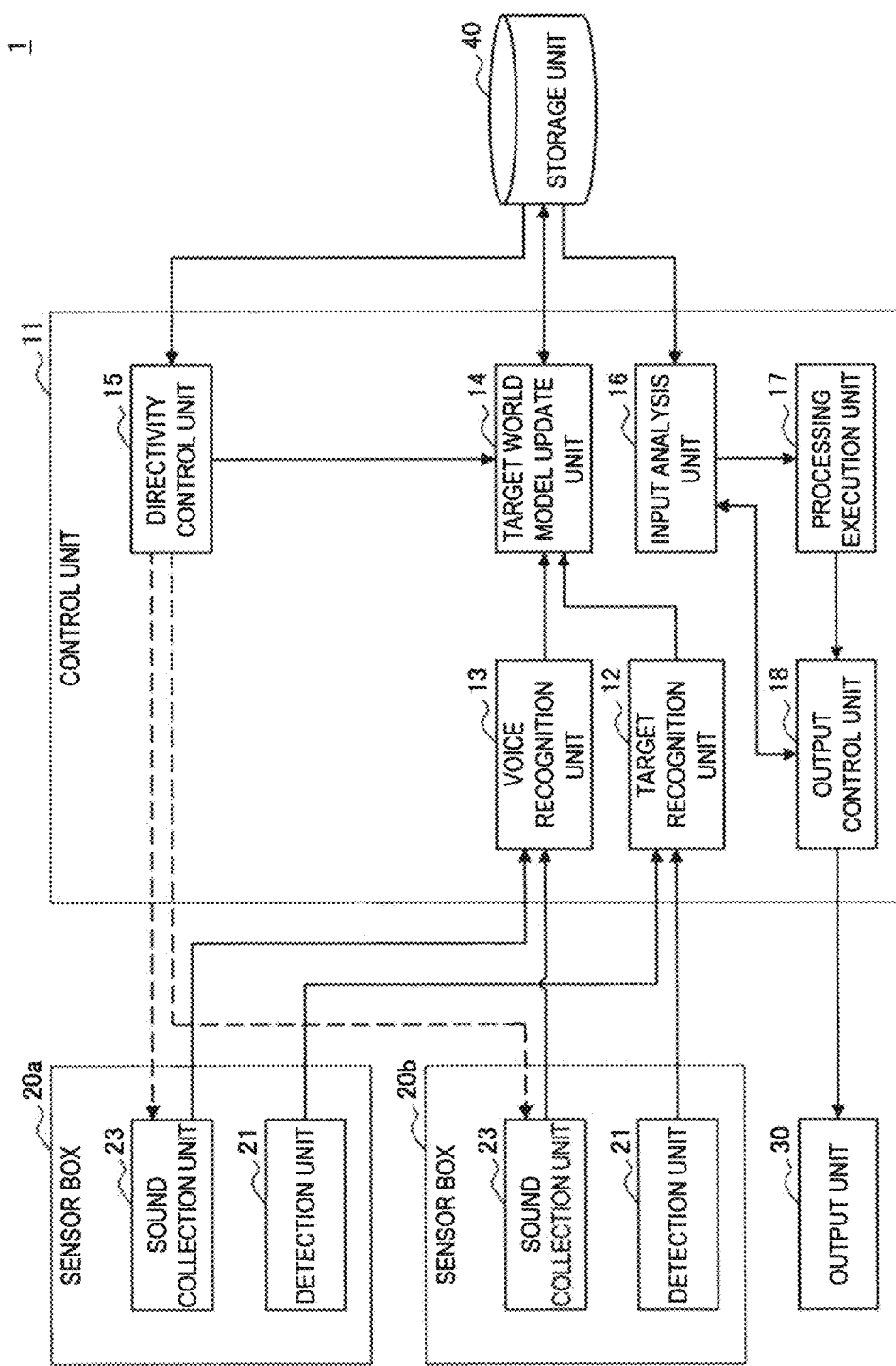

[Fig. 7]
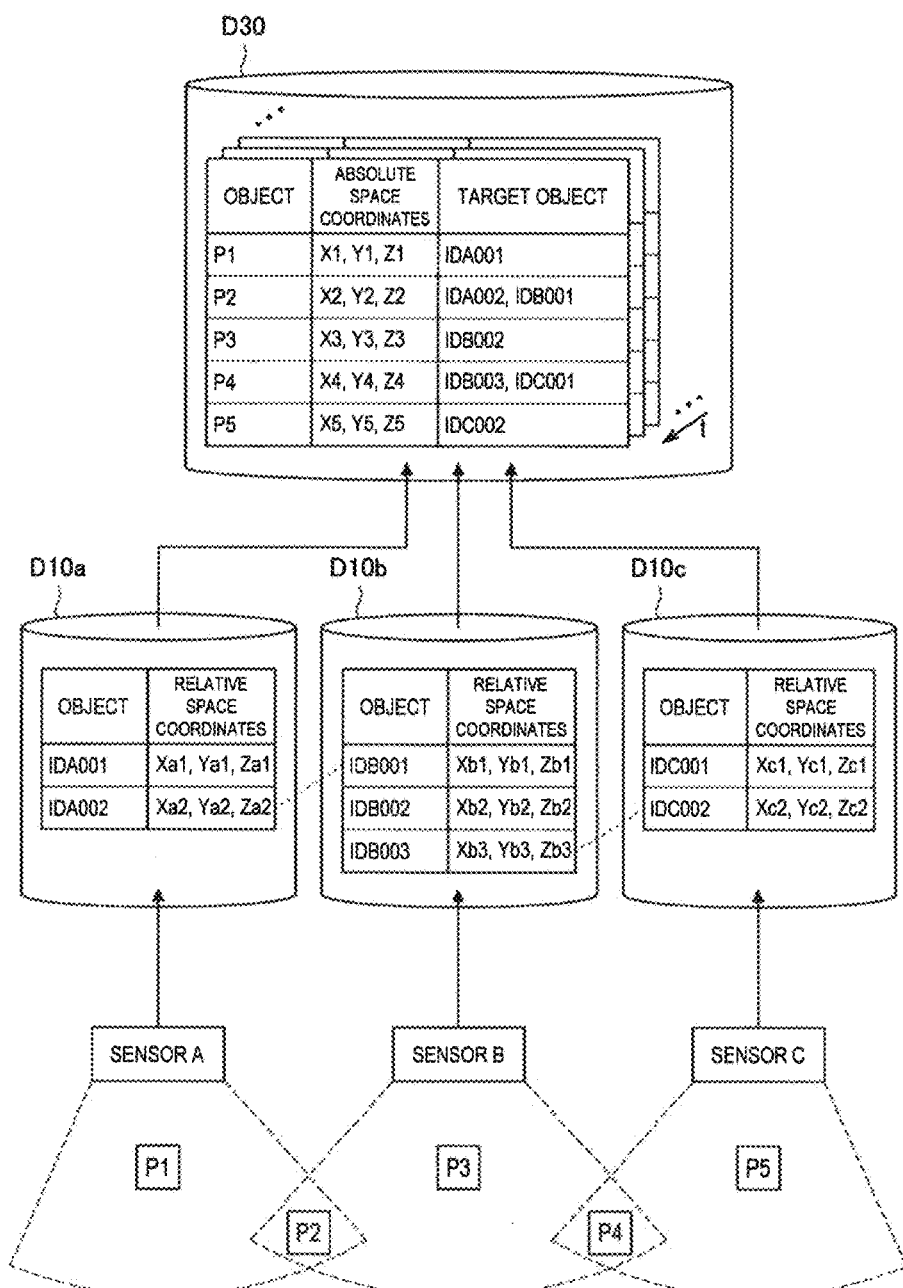

[Fig. 8]
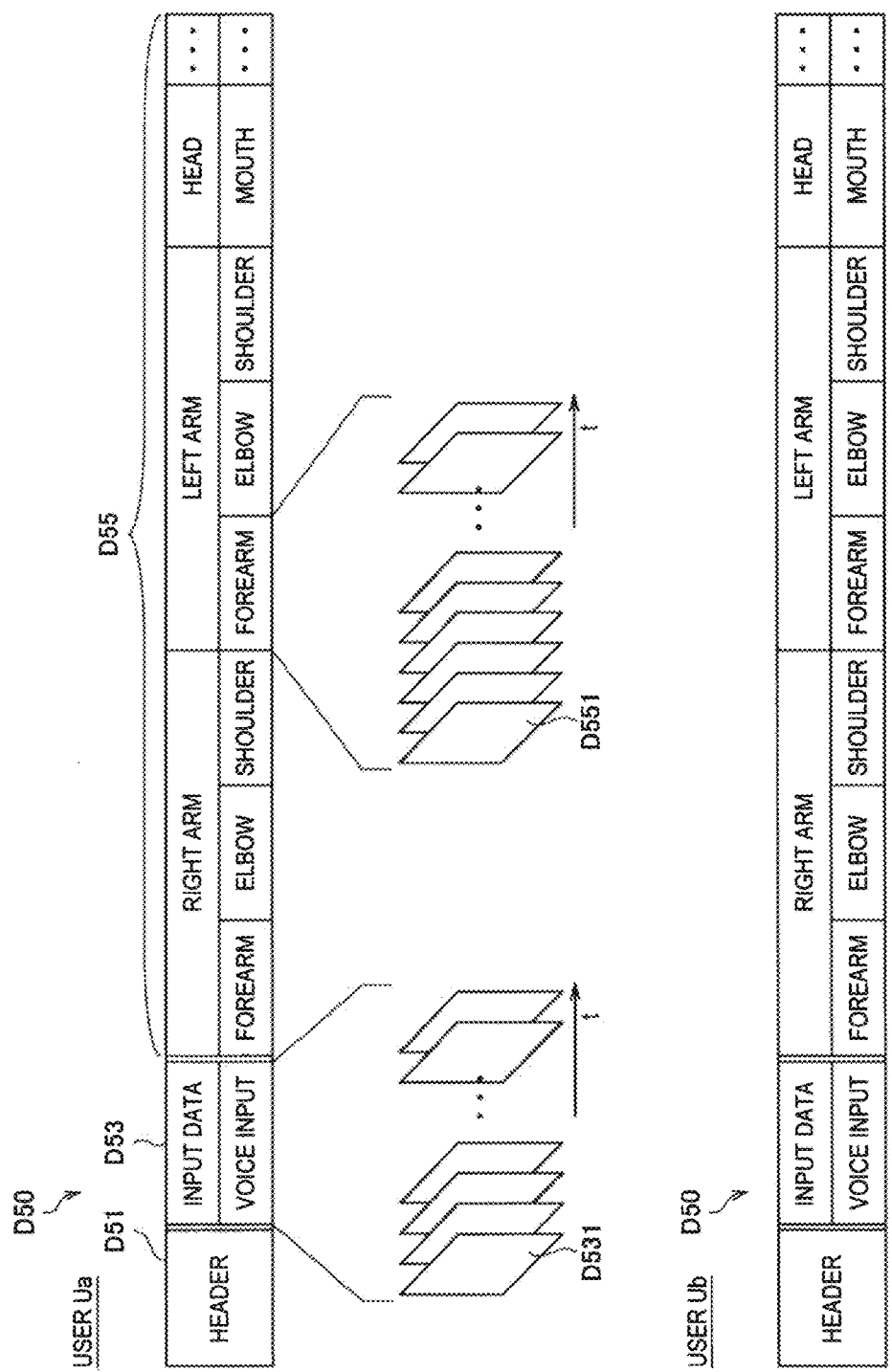

[Fig. 9]
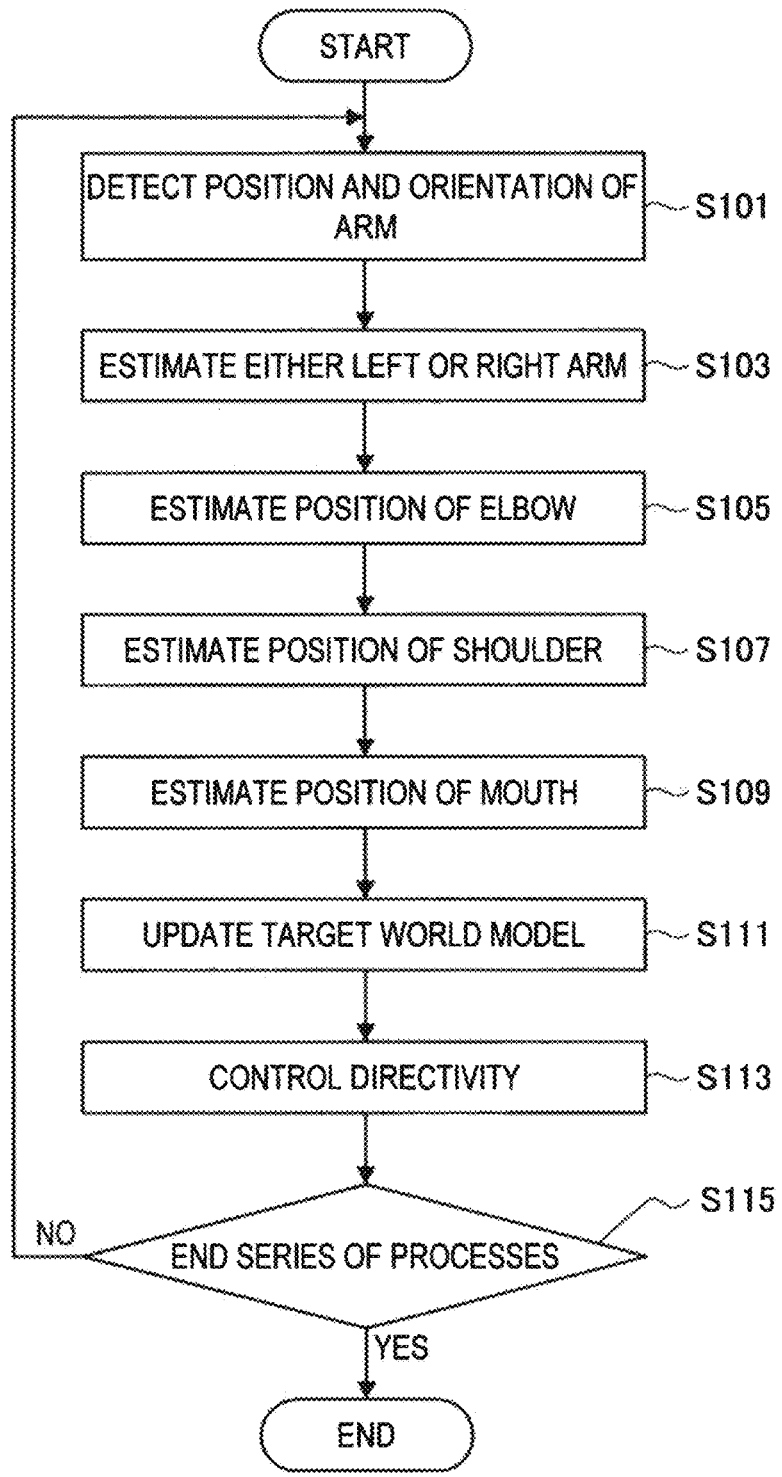

[Fig. 10]
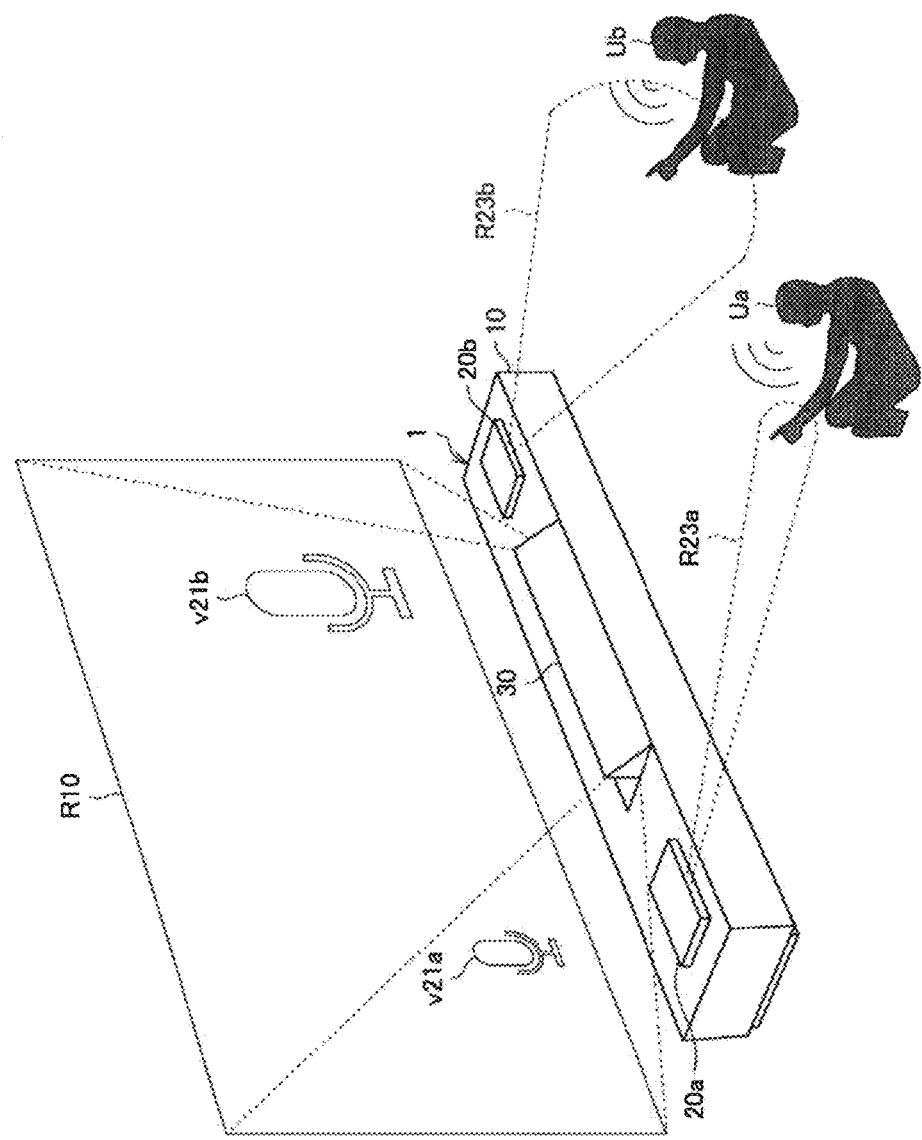

[Fig. 11]
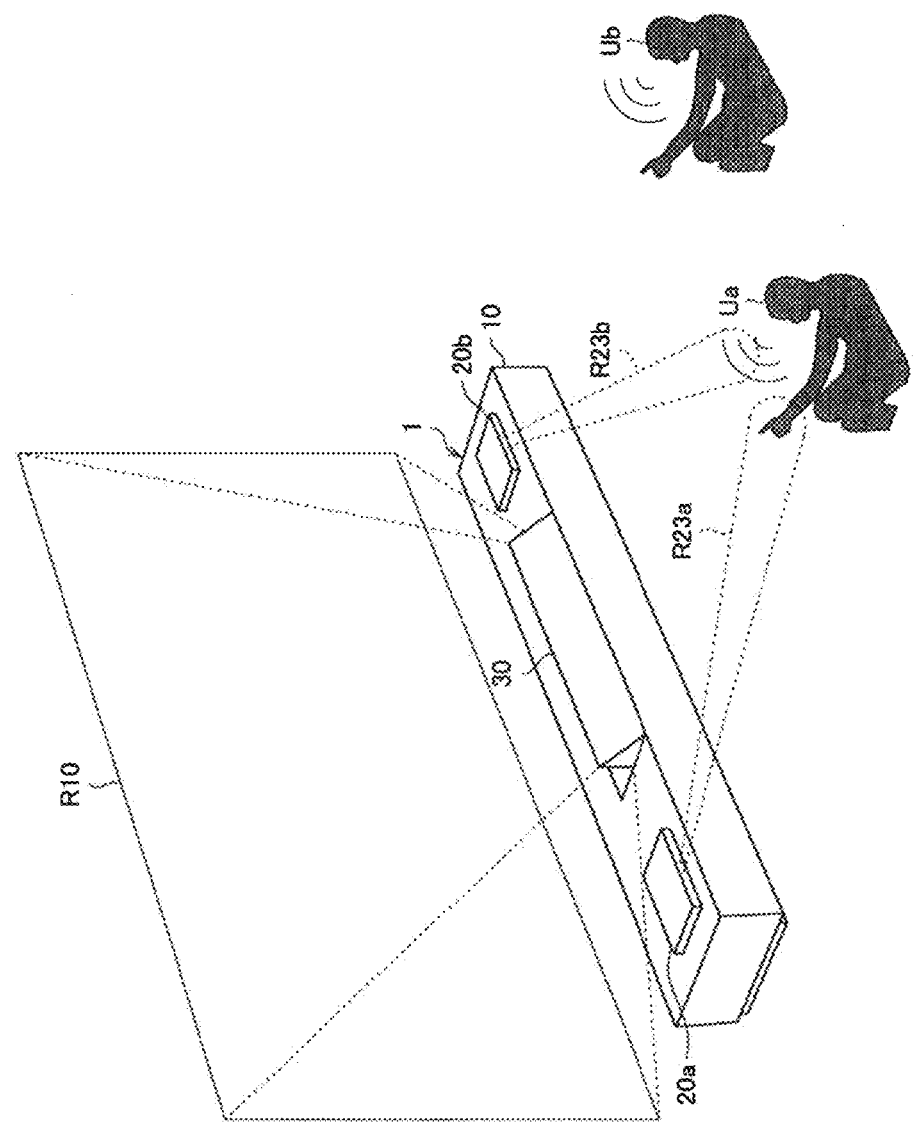

[Fig. 12]
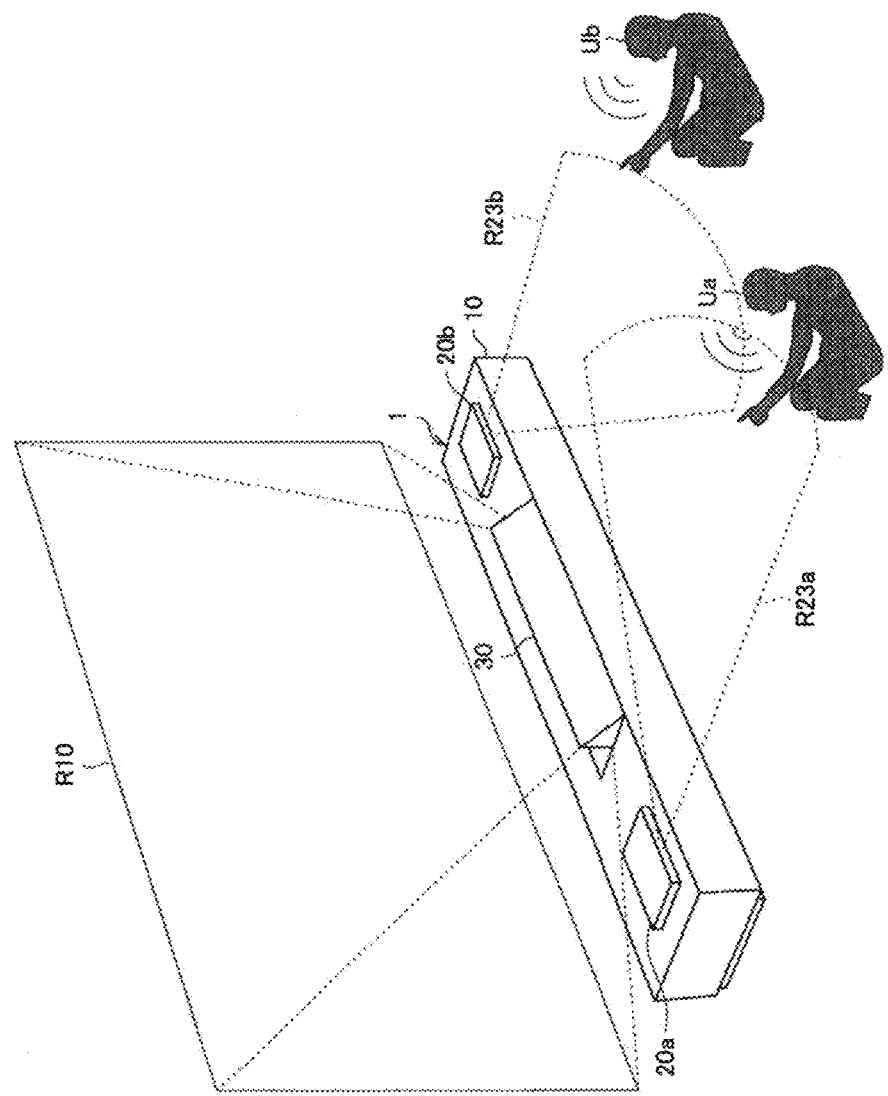

[Fig. 13]
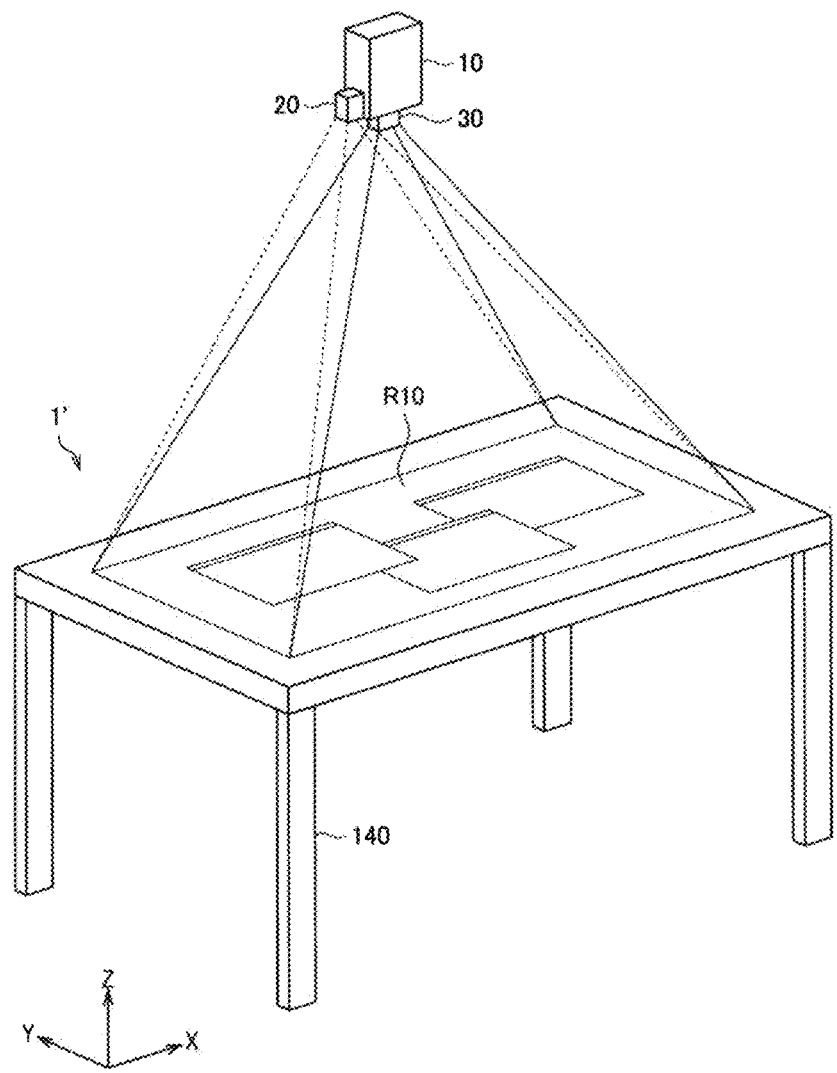

[Fig. 14]
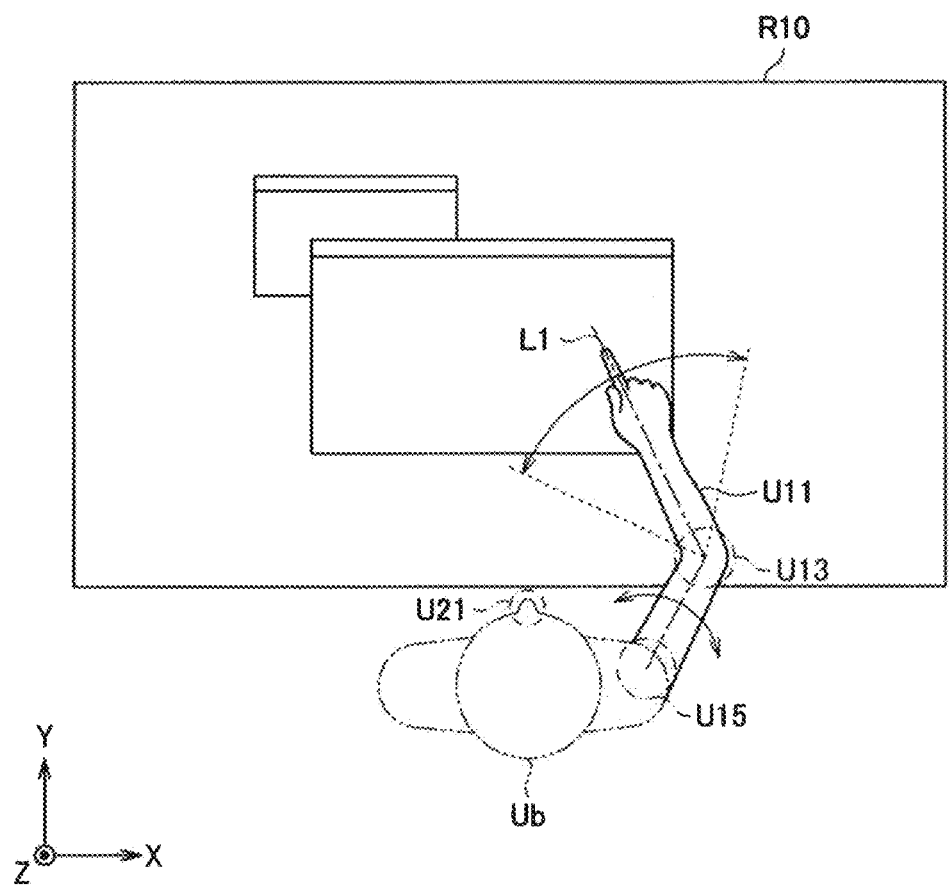

[Fig. 15]
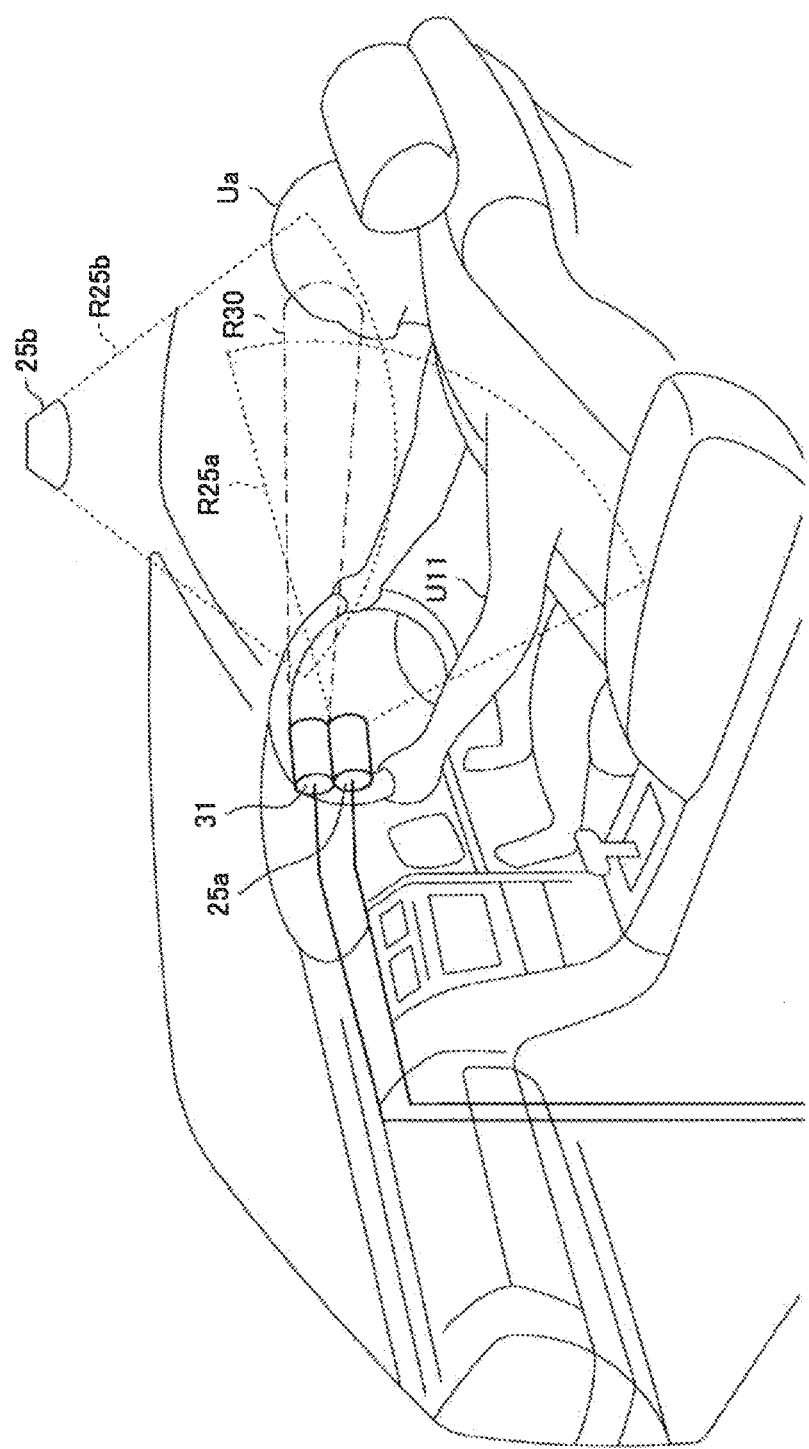

[Fig. 16]
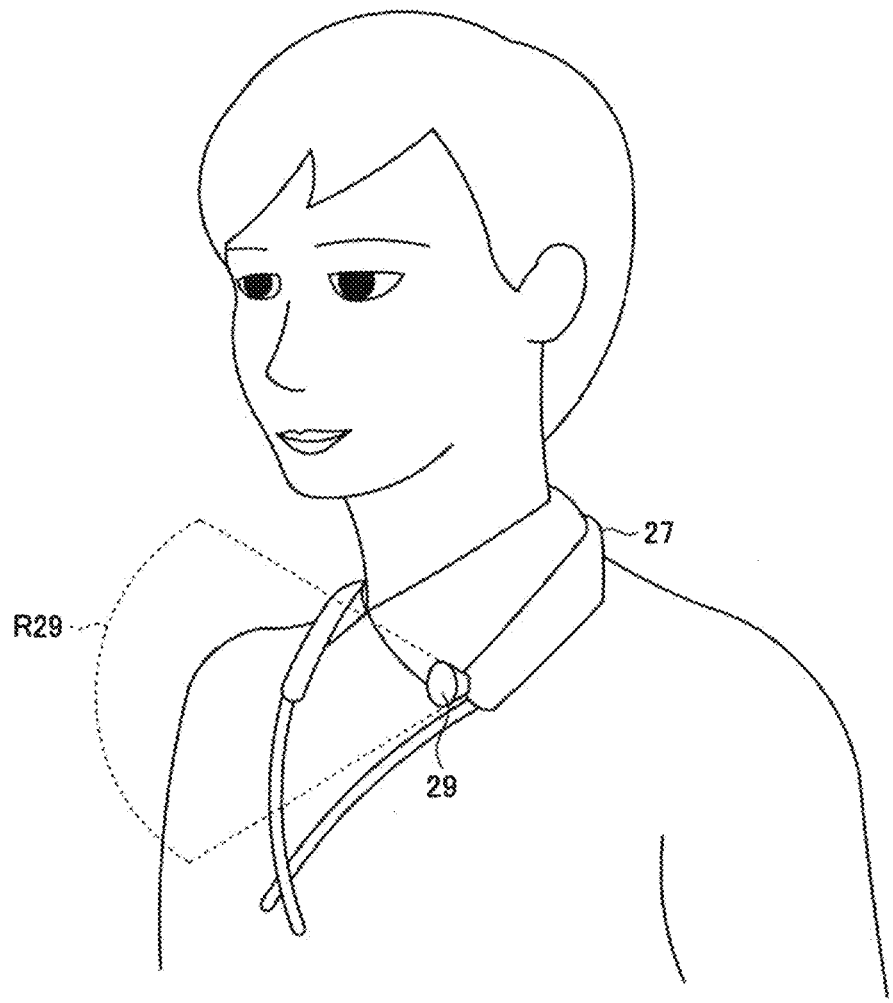

[Fig. 17]
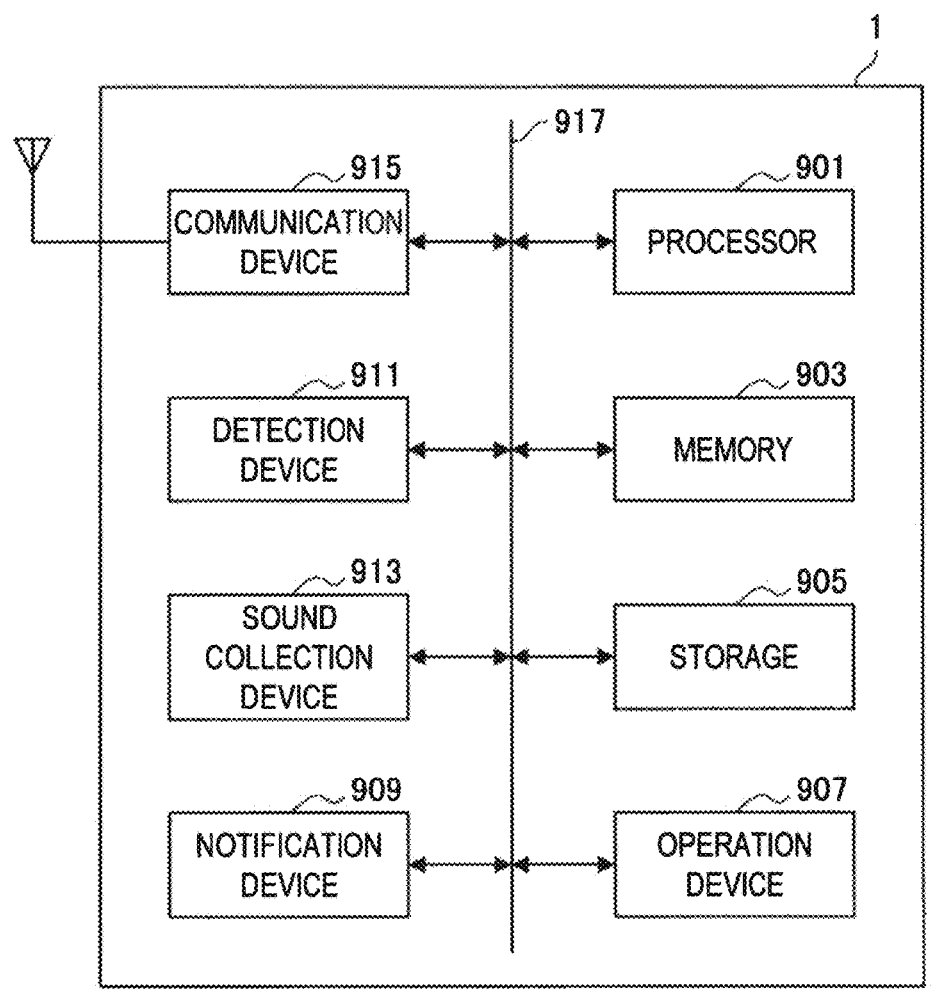

ated to detecting a position of a portion of at least a part of a user's body with higher accuracy.

INFORMATION PROCESSING APPARATUS, INFORMATION PROCESSING METHOD, AND PROGRAM

CROSS REFERENCE TO RELATED APPLICATIONS

This application is a National Stage Patent Application of PCT International Patent Application No. PCT/JP2016/001296 filed Mar. 9, 2016 under 35 U.S.C. § 371, which claims the benefit of Japanese Priority Patent Application JP 2015-078328 filed Apr. 7, 2015, the entire contents of which are incorporated herein by reference.

TECHNICAL FIELD

The present disclosure relates to an information processing apparatus, an information processing method, and a program.

BACKGROUND ART

In recent years, User Interfaces (UI) for operating various types of household electrical appliances such as a television receiver, or various types of devices such as a vehicle onboard device such as a car navigation system or the like, have diversified. Among such UIs, a user is capable of performing operations of various types of devices by presenting an instruction content by a voice, a visual line movement or the like, and not via a direct operation by an operation device such as buttons, a touch panel or the like.

CITATION LIST

Patent Literature

[PTL 1]
JP2011-41096A

SUMMARY

Technical Problem

Further, in recent years, the situations in which various types of devices are used have diversified, and a situation can also be assumed where a plurality of users use one device. By assuming a use under such a condition, a mechanism for more accurately detecting information such as a voice or a visual line movement, presented by a user who is an operator, has also been considered, as a UI which enables various types of devices to be operated based on a voice or a visual line movement. For example, PTL 1 discloses an example of technology for enabling a voice from a user to be collected with a better quality, by controlling the directivity of a sound collection unit such as a microphone or the like, in accordance with an estimation result of the position of this user.

On the other hand, as described above, in order to further improve a detection accuracy of information such as a voice or a visual line movement presented by a user, a mechanism is sought after which is capable of more accurately estimating the position of a portion which becomes a point of origin of this information, such as this user's mouth, eyes or the like.

Accordingly, the present disclosure proposes an information processing apparatus, an information processing method, and a program, capable of further improving an estimation accuracy of the position of a portion of at least a part of a user's body.

Solution to Problem

According to an aspect of the present disclosure, there is provided an apparatus including circuitry configured to determine a position of a mouth of a user that is distinguishable among a plurality of people, and control an acquisition condition for collecting a sound based on the determined position of the user's mouth.

Further, according to another aspect of the present disclosure, there is provided an information processing method, which is performed via at least one processor, and the method including determining a position of a mouth of a user that is distinguishable among a plurality of people, and controlling an acquisition condition for collecting a sound based on the determined position of the user's mouth.

Further, according to another aspect of the present disclosure, there is provided a non-transitory computer-readable medium having embodied thereon a program, which when executed by a computer causes the computer to execute a method including determining a position of a mouth of a user that is distinguishable among a plurality of people, and controlling an acquisition condition for collecting a sound based on the determined position of the user's mouth.

Advantageous Effects of Invention

According to an embodiment of the present disclosure such as described above, an information processing apparatus, an information processing method, and a program are provided, capable of further improving an estimation accuracy of the position of a portion of at least a part of a user's body.

Note that the effects described above are not necessarily limitative, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram for describing an example of a schematic configuration of an information processing apparatus according to an embodiment of the present disclosure.

FIG. 2 is an explanatory diagram for describing an outline of a configuration and operation of a sensor box.

FIG. 3 is an explanatory diagram for describing an example of a method which recognizes the position or orientation of a prescribed portion of a user's body.

FIG. 4 is an explanatory diagram for describing an outline of the information processing apparatus according to an embodiment.

FIG. 5 is a figure which schematically shows sections corresponding to a body trunk and limbs.

FIG. 6 is a block diagram which shows an example of a functional configuration of the information processing apparatus according to an embodiment.

FIG. 7 is an explanatory diagram for describing an outline of an operation of a target world model update unit.

FIG. 8 is an explanatory diagram for describing an example of a data structure of a human model.

FIG. 9 is a flow chart which shows an example of the flow of a series of processes of the information processing apparatus according to an embodiment.

FIG. 10 is an explanatory diagram for describing an example of the operation of the information processing apparatus according to a modified example 1.

FIG. 11 is an explanatory diagram for describing another example of the operation of the information processing apparatus according to the modified example 1.

FIG. 12 is an explanatory diagram for describing another example of the operation of the information processing apparatus according to the modified example 1.

FIG. 13 is an explanatory diagram for describing an outline of the information processing apparatus according to a modified example 2.

FIG. 14 is an explanatory diagram for describing an outline of the information processing apparatus according to a modified example 2.

FIG. 15 is an explanatory diagram for describing an outline of the information processing apparatus according to a modified example 3.

FIG. 16 is an explanatory diagram for describing an outline of the information processing apparatus according to a modified example 3.

FIG. 17 is a figure which shows an example of a hardware configuration of the information processing apparatus according to an embodiment.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Schematic configuration
2. Functional configuration
3. Processes
4. Modified examples
4.1. Modified example 1: Example of a directivity control
4.2. Modified example 2: Example of a system configuration
4.3. Modified example 3: Application example to an onboard apparatus
5. Hardware configuration
6. Summary

1. Schematic Configuration

First, an example of a schematic configuration of an information processing apparatus according to an embodiment of the present disclosure will be described by referring to FIG. 1. FIG. 1 is an explanatory diagram for describing an example of a schematic configuration of an information processing apparatus 1 according to an embodiment. As shown in FIG. 1, the information processing apparatus 1 according to an embodiment includes sensor boxes 20a and 20b, an output unit 30 for presenting display information, and a main body 10 in which a control unit, which controls various operations of the information processing apparatus 1, is included. Note that, in the following description, in the case where the sensor boxes 20a and 20b are not particularly distinguished, there will be cases where they are simply called a "sensor box 20".

The output unit 30 is constituted as a so-called projector, and presents display information (for example, an operation screen), which becomes a presentation target, to a user by projecting this display information on a prescribed projection surface. For example, in the example shown in FIG. 1, the output unit 30 is constituted as a so-called single focus projector, and presents display information such as an operation screen to a user by projecting this display information on a wall surface shown by reference numeral 90. Note that, in the following description, there will be cases where a region (that is, a projection surface) on which information (that is, display information) is projected by the output unit 30 is called a "region R10".

Further, the information processing apparatus 1 is constituted for a user to be capable of operating by an operation using an arm or hand such as pointing or the like (a gesture), or a voice input. The sensor box 20 has a configuration for recognizing information to be presented for a user to operate the information processing apparatus 1, such as an operation using an arm or hand such as pointing or the like (a gesture) or voice input by this user. Note that, in the example shown in FIG. 1, while two sensor boxes 20a and 20b are included as the sensor box 20, it is not necessarily limited to the same configuration, and the number of sensor boxes 20 is not particularly limited.

Here, an outline of a schematic configuration and operation of the sensor box 20 will be described by referring to FIG. 2. FIG. 2 is an explanatory diagram for describing an outline of a configuration and operation of the sensor box 20, and shows an example of a schematic configuration of the information processing apparatus 1 shown in FIG. 1 in the case where looking down at this information processing apparatus 1 from above in a vertical direction. Note that, in FIG. 2, in order to easily understand the description, the sensor boxes 20a and 20b, and the output unit 30, are presented from among the configurations of the information processing apparatus 1, and an illustration for the configurations other than these are omitted.

As shown in FIG. 2, the sensor box 20 includes a detection unit 21, and a sound collection unit 23.

The sound collection unit 23 can be constituted as a sound collection device for collecting a voice input from a user such as a so-called microphone. That is, the sound collection unit 23 collects a voice input from a user as sound information.

Further, the sound collection unit 23 is constituted as a so-called directivity device, and is constituted to enable the directivity of a region which collects sound information to be controlled. For example, in FIG. 2, reference numeral R23a schematically shows the orientation and width (that is, the directivity) of a region where the sound collection unit 23 included in the sensor box 20a collects sound information. Similarly, reference numeral R23b schematically shows the orientation and width of a region where the sound collection unit 23 included in the sensor box 20b collects sound information. Note that, hereinafter, there will be cases where the region shown by reference numeral R23a is called a "sound collection region R23a". Similarly, there will be cases where the region shown by reference numeral R23b is called a "sound collection region R23b". Further, in the case where the sound collection regions R23a and R23b are not particularly distinguished, there will be cases where they are simply called a "sound collection region R23".

Note that, while the details will be described below, the information processing apparatus 1 according to an embodiment estimates the position of a user's mouth, and controls the directivity of this sound collection unit 23 so that the sound collection unit 23 faces the estimated position of the mouth, based on an estimation result. By such a configuration, it becomes possible for the sound collection unit 23 to more accurately collect a voice input from a user who becomes a target (for example, a user recognized as an operator).

In particular, as shown in FIG. 1 and FIG. 2, under a condition such as there being a plurality of users present, in the case where a voice input is collected from one user Ua, there will be cases where a voice input from another user Ub functions as noise. Also under such a condition, by having the directivity of the sound collection unit 23 controlled so that this sound collection unit 23 faces the direction of the user Ua's mouth, it becomes possible for this sound collection unit 23 to suppress an influence of a voice input from the user Ub, and to more accurately collect a voice input from the user Ua.

The detection unit 21 acquires various types of information, for detecting an operation using a portion such as an arm or hand by a user, that is, the position or orientation of this portion.

For example, in the example shown in FIG. 2, the information processing apparatus 1 (specifically, the control unit included in the main body 10) detects a change in the position or orientation of a portion U11 corresponding to a user's forearm along a time series, based on a detection result by the detection unit 21, and recognizes an operation of the user using this portion U11, based on this detection result.

For example, in FIG. 2, reference numeral U11a shows a portion corresponding to the user Ua's forearm, and reference numeral L1a schematically shows an axis (long axis) of this portion U11a. That is, by detecting the position or orientation of the portion U11a, based on a detection result by the detection unit 21, and specifying the axis L1a in accordance with this result, it becomes possible for the information processing apparatus 1 to specify the position of the region R10 (and consequently, display information displayed within the region R10), to which the user indicates by the portion U11. Further, by collating a recognition result of a change in the position or orientation of the portion U11a along a time series with a pattern of a change in the position or orientation of the portion U11, which corresponds to a prescribed operation (gesture) (hereinafter, there will be cases where this is called an "operation pattern"), it becomes possible for the information processing apparatus 1 to recognize an operation (gesture) of the user Ua using this portion U11a.

Similarly, reference numeral U11b shows a portion corresponding to the user Ub's forearm, and reference numeral L1b schematically shows an axis (long axis) of this portion U11b. That is, the information processing apparatus 1 recognizes the position of the region R10, to which the user Ub indicates by the portion U11b, and an operation (gesture) using this portion U11a, based on a detection result of the position or orientation of the portion U11b.

The detection unit 21 can be constituted by a so-called ranging sensor, such as a stereo image sensor or the like. In FIG. 2, reference numeral R21a schematically shows the orientation and width of a detection range of the detection unit 21 included in the sensor box 20a. Similarly, reference numeral R21b schematically shows the orientation and width of a detection range of the detection unit 21 included in the sensor box 20b. Note that, in the following description, in the case where the detection ranges R21a and R21b are not particularly distinguished, there will be cases where they are simply called a "detection range R21".

Here, an example of a method which recognizes the position or orientation of a prescribed portion of a user's body, based on a detection result by the detection unit 21, in the case where a ranging sensor is applied as the detection unit 21, will be described by referring to FIG. 3. FIG. 3 is an explanatory diagram for describing an example of a method which recognizes the position or orientation of a prescribed portion of a user's body.

For example, a distance with a user present in the detection range R21 is detected, while scanning within this detection range R21, in the detection unit 21, and when each detection result by this detection unit 21 is mapped, a set of point information showing each detection result is obtained, such as shown in FIG. 3. Note that, hereinafter, there will be cases where the set of point information showing a detection result by the detection unit 21, such as shown in FIG. 3, is called a "point cloud".

The information processing apparatus 1 collects, as a group, a set of point information thought to be a same object, based on a position relationship (an inclination of distribution) of each point information, an inclination of movement along a time series of each point information or the like, for example, within a point cloud acquired based on a detection result by the detection unit 21. The information processing apparatus 1 extracts groups which correspond to prescribed portions, based on a shape feature of each group, a position relationship between each group, a change in the position and orientation of each group or the like, from among each of such acquired groups. Further, at this time, by applying a principal component analysis to the point information included in each group, for example, the information processing apparatus 1 may detect, as a main axis, a principal component (an axis with the largest scattering) based on the point information included in this group, and may specify the shape or orientation (orientation of the main axis) of the group, based on a detection result of this main axis.

By a process such as described above, it becomes possible for the information processing apparatus 1 to extract a long-type group which corresponds to the portion U11 corresponding to the forearm of a user's right arm, and a main axis L1 of this long-type group, from within a point cloud, for example, such as shown in FIG. 3. Similarly, it is needless to say that the information processing apparatus 1 is capable of extracting a long-type group which corresponds to a portion U11' corresponding to the forearm of a user's left arm, and a main axis L1' of this long-type group, from within a point cloud.

Note that, the configuration of the detection unit 21 will not be limited to the so-called ranging sensor described above, if the information processing apparatus 1 can recognize the position or orientation of a prescribed portion of a user (for example, the portion U11 corresponding to a forearm in FIG. 2). As a specific example, the detection unit 21 may be constituted as an imaging unit for capturing an image of a photographic subject. In this case, the information processing apparatus 1 may detect the position or orientation of a prescribed portion (for example, the portion U11 corresponding to a forearm), by applying an image analysis to an image of a user captured by the detection unit 21.

Further, the subject which acquires information for this recognition will not necessarily be limited to the detection unit 21 included in the sensor box 20, if the information processing apparatus 1 can recognize the position or orientation of a prescribed portion of a user. For example, the information processing apparatus 1 may recognize the position or orientation of a prescribed portion of a user, based on a detection result of a so-called wearable device worn on this prescribed portion.

As a specific example, a detection device such as a Global Positioning System (GPS), or various types of sensors such as an acceleration sensor or an angular velocity sensor, may be included in a wearable device, and the information processing apparatus 1 may use a detection result of this detection device. In this case, the information processing apparatus 1 may recognize the position or orientation of the wearable device, based on a detection result of this detection device, and may recognize the position or orientation of an arm on which the wearable device is worn, based on a recognition result of the position or orientation of this wearable device.

Further, as another example, a sensor which detects an approach of a user (in other words, a portion such as an arm) to a specific detection range, such as an optical sensor, an infrared sensor or the like, may be used for the recognition of the position or orientation of a prescribed portion of the user. Specifically, by including a plurality of sensors with mutually different detection ranges, it becomes possible for the information processing apparatus 1 to recognize whether a portion such as a user's arm is positioned in the detection range of some sensor, based on a detection result of each sensor.

Further, the information processing apparatus 1 according to an embodiment estimates the position or orientation of other portions of a user, based on a recognition result of the position or orientation of the prescribed portion U11 of this user. For example, FIG. 4 is an explanatory diagram for describing an outline of the information processing apparatus 1 according to an embodiment, and is a figure for describing an example of the process for the information processing apparatus 1 to estimate the position or orientation of other portions, based on a recognition result of the portion U11.

For example, in the example shown in FIG. 4, the information processing apparatus 1 estimates the position or orientation of a portion U21 corresponding to the user's mouth, based on a recognition result of the position or orientation of the portion U11 corresponding to this user's forearm.

Specifically, the information processing apparatus 1 recognizes a movable range of the portion U11 corresponding to a forearm, based on a change along a time series of the position or orientation of this portion U11, and estimates the position or orientation of a portion U13 corresponding to an elbow, which becomes a base point of movement of the portion U11, based on the recognized movable range. In other words, the information processing apparatus 1 recognizes a movable range of the portion U11 corresponding to a forearm, based on a track of movement of this portion U11 (that is, a history of the position or orientation of the portion U11), and estimates the position or orientation of the portion U13 corresponding to an elbow, based on the recognized movable range. Further, the information processing apparatus 1 estimates a movable range of the portion U13 corresponding to an elbow, based on a change along a time series of the position or orientation of this portion U13, and estimates the position or orientation of a portion U16 corresponding to a shoulder, which becomes a base point of movement of the portion U13, based on the estimated movable range. In other words, the information processing apparatus 1 recognizes a movable range of the portion U13 corresponding to an elbow, based on a track of movement of this portion U13 (that is, a history of the position or orientation of the portion U13), and estimates the position or orientation of the portion U15 corresponding to a shoulder, based on the recognized movable range. Also, the information processing apparatus 1 estimates the position of the portion U21 corresponding to a mouth, based on an estimation result of the position or orientation of the portion U15 corresponding to a shoulder.

Further, at this time, the information processing apparatus 1 may improve the accuracy of an estimation of the portion U21 corresponding to a mouth, by estimating the position or orientation of a portion U15' corresponding to a shoulder, similarly for the other arm, and using this estimation result for an estimation of this portion U21.

Note that, the example shown in FIG. 4 is merely an example, and the portion which becomes a target will not be particularly limited, if the information processing apparatus 1 can have the position or orientation of another portion (for example, the portion U21) estimated, based on a recognition result of the position or orientation of a portion of a part of a user (for example, the portion U11).

Note that, it is desirable for the portion which becomes an estimation target of the position or orientation by the information processing apparatus 1 to be a portion, with a comparatively small movement, of a user's body. A portion of at least a part, included in a user's body trunk, can be included, for example, as the portion which becomes an estimation target.

Note that, in the present description, the body trunk shows the section, except for the limbs, of the body. The head, cervix, chest, abdomen, pelvic area, and tail area are included, for example, in the body trunk. Further, the limbs correspond to the hands and feet extending from the body trunk, and front limbs (upper limbs) and back limbs (lower limbs) are included. For example, FIG. 5 is a figure which schematically shows the sections called the body trunk and the limbs in the present description. In FIG. 5, the sections shown by reference numeral U10 correspond to the limbs, and the section shown by reference numeral U20 corresponds to the body trunk.

Further, it is desirable for the portion which becomes a target of recognition based on a detection result of the detection unit 21 (that is, a portion used for estimating the position or orientation of other portions), by the information processing apparatus 1, to be a portion, with a comparatively large movement, of a user's body. A portion of at least a part, included in a user's limbs, can be included, for example, as the portion which becomes a target of recognition. Further, as another example, a portion with a movable range of a prescribed threshold or more (for example, 90 degrees or more) may be set to a target of recognition based on a detection result of the detection unit 21. Further, as another example, a portion having at least two degrees of freedom as a degree of freedom of movement may be set to a target of recognition based on a detection result of the detection unit 21.

As described above, the information processing apparatus 1 estimates the position of a user's mouth, and controls the directivity of the sound collection unit 23, so that the sound collection region R23 of this sound collection unit 23 faces the estimated direction of the mouth.

For example, in the case of the example shown in FIG. 2, the information processing apparatus 1 sequentially estimates the position or orientation of a portion U13a corresponding to an elbow and a portion U15a corresponding to a shoulder, respectively, based on a change in the position or orientation of the portion U11a corresponding to the user Ua's forearm. Also, the information processing apparatus 1 estimates the position or orientation of a portion U21a corresponding to a mouth, based on an estimation result of a portion U15a corresponding to a shoulder, and controls the directivity of the sound collection unit 23, so that the sound collection region R23a of this sound collection unit 23 of the sensor box 20a faces the direction of this portion U21a. In this way, it becomes possible for the information processing apparatus 1 to more accurately collect a voice input from the user Ua, by the sound collection unit 23 of the sensor box 20a.

Similarly, the information processing apparatus 1 sequentially estimates the position or orientation of a portion U13b corresponding to an elbow and a portion U15b corresponding to a shoulder, respectively, based on a change in the position or orientation of the portion U11b corresponding to the user Ub's forearm. Also, the information processing apparatus 1 estimates the position or orientation of a portion U21b corresponding to a mouth, based on an estimation result of a portion U15b corresponding to a shoulder, and controls the directivity of the sound collection unit 23, so that the sound collection region R23b of this sound collection unit 23 of the sensor box 20b faces the direction of this portion U21b. In this way, it becomes possible for the information processing apparatus 1 to more accurately collect a voice input from the user Ub, by the sound collection unit 23 of the sensor box 20b.

As described above, the information processing apparatus 1 recognizes an operation using an arm or hand by the user, and recognizes display information (display objects of various types of contents) displayed within the region R10 to which the user indicates, and the content of an operation to this display information, in accordance with a recognition result. Further, the information processing apparatus 1 collects a voice spoken from the user, and recognizes the content instructed by a voice input from the user, by applying so-called voice recognition technology to the collected voice. Also, the information processing apparatus 1 executes various types of processes (for example, applications) in accordance with a recognized user operation, and controls an operation of the output unit 30, so that display information displayed in the region R10 is updated in accordance with an execution result.

Heretofore, an outline of the information processing apparatus 1 according to an embodiment has been described by referring to FIG. 1 to FIG. 5.

Note that, the above described example is merely an example, and the target of a directivity control by the information processing apparatus 1 is not necessarily limited to the sound collection unit 23 such as a microphone or the like.

As a specific example, the above described estimation of a portion, and a directivity control based on this estimation result, may be applied to a so-called process relating to the recognition of a user's visual line. In this case, for example, the information processing apparatus 1 may sequentially estimate the position and orientation in the order of an elbow and a shoulder, based on a recognition result of the position and orientation of the portion U11 corresponding to the user's forearm, and may estimate the position and orientation of the user's eyes, based on this estimation result. Also, the information processing apparatus 1 may control the orientation of an imaging unit which captures a photographic subject, so that an imaging region of this imaging unit faces the direction of the user's eyes.

In this way, it becomes possible for the information processing apparatus 1 to capture only a region near a user's eyes, in order to recognize this user's visual line, and it becomes possible for the information processing apparatus 1 to recognize this user's visual line, even in the case where an imaging unit with a narrow viewing angle is used. Further, since it becomes possible to capture only a region near a user's eyes, it becomes possible for this information processing apparatus 1 to reduce the load of image processing for visual line recognition, compared to the case where a region is captured which is wider than that near these eyes.

Similarly, the above described estimation of a portion, and a directivity control based on this estimation result, may be applied to a so-called process relating to facial recognition of a user. In this case, for example, the information processing apparatus 1 may estimate the position and orientation of the portion U15 corresponding to a shoulder, based on a recognition result of the position and orientation of the portion U11 corresponding to the user's forearm, and may estimate the position and orientation of the user's face, based on this estimation result. Also, the information processing apparatus 1 may control the orientation of an imaging unit which captures a photographic subject, so that an imaging region of this imaging unit faces the direction of the user's face.

Further, as another example, the above described estimation of a portion, and a directivity control based on this estimation result, may be applied to a so-called process relating to a directivity control of an acoustic device such as a speaker. In this case, for example, the information processing apparatus 1 may estimate the position and orientation of the portion U15 corresponding to a shoulder, based on a recognition result of the position and orientation of the portion U11 corresponding to the user's forearm, and may estimate the position and orientation of the user's ears, based on this estimation result. Also, the information processing apparatus 1 may control the directivity of an acoustic device such as a speaker, so that the direction to which this acoustic device outputs sound information faces the direction of the user's ears.

In this way, it becomes possible for the information processing apparatus 1 to output sound information towards a specific user, so that this user can recognize the sound information, even under a condition such as there being a plurality of users present.

2. Functional Configuration

Next, an example of a functional configuration of the information processing apparatus 1 according to an embodiment will be described by referring to FIG. 6. FIG. 6 is a block diagram which shows an example of a functional configuration of the information processing apparatus 1 according to an embodiment, and shows an example of a functional configuration of the information processing apparatus 1 shown in FIG. 1.

As shown in FIG. 6, the information processing apparatus 1 according to an embodiment includes a control unit 11, sensor boxes 20a and 20b, an output unit 30, and a storage unit 40. Note that, the sensor boxes 20a and 20b, and the output unit 30, respectively correspond to the sensor boxes 20a and 20b, and the output unit 30, described with reference to FIG. 2. Accordingly, a detailed description will be omitted for the sensor boxes 20a and 20b, and the output unit 30. Note that, in the present description, the sensor box 20 (for example, each of the sensor boxes 20a and 20b) includes a detection unit 21, and a sound collection unit 23, similar to the example shown in FIG. 2.

As shown in FIG. 6, the control unit 11 includes a target recognition unit 12, a voice recognition unit 13, a target world model update unit 14, a directivity control unit 15, an input analysis unit 16, a processing execution unit 17, and an output control unit 18.

The target recognition unit 12 acquires a detection result of an object (for example, at least a part of a user's body) present within a detection range R21 of the detection unit 21, from the detection unit 21 of each sensor box 20. The target recognition unit 12 extracts information of a portion which becomes a target, by analyzing the acquired detection result, and recognizes the position or orientation of this portion based on an extraction result.

Note that, a method which recognizes the position or orientation of a portion which becomes a target, based on a detection result by the detection unit 21, is as previously described with reference to FIG. 3. That is, in the case of the example shown in FIG. 3, the target recognition unit 12 recognizes the position or orientation of the portion U11 corresponding to a user's forearm, based on a detection result of the detection unit 21 constituted as a ranging sensor. Note that, in the following description, the target recognition unit 12 recognizes the position or orientation of the portion U11 corresponding to a user's forearm, based on a detection result by the detection unit 21.

Also, the target recognition unit 12 outputs control information showing a recognition result of the position or orientation of the portion U11 which becomes a target to the target world model update unit 14, for each detection unit 21 (or, for each sensor box 20).

The voice recognition unit 13 acquires collected sound information, from the sound collection unit 23 of each sensor box. The voice recognition unit 13 detects a voice segment from the acquired sound information, and extracts the section corresponding to this voice segment (that is, a sound signal) from this sound information as a voice input. The voice recognition unit 13 converts the extracted voice input into character information, by performing analysis based on so-called voice recognition technology.

Also, the voice recognition unit 13 outputs a result of analysis based on voice recognition technology (hereinafter, there will be cases where this is called a "result of voice recognition"), that is, the character information to which a voice input has been converted, to the target world model update unit 14, for each sound collection unit 23 (or, for each sensor box 20).

The target world model update unit 14 acquires control information showing a recognition result of the position or orientation of the portion U11 which becomes a target, from the target recognition unit 12, for each detection unit 21.

Note that, at this time, the position or orientation of the portion U11, for which control information acquired for each detection unit 21 is shown, shows a relative position relationship of the portion U11 with respect to this detection unit 21. Accordingly, the target world model update unit 14 integrates a recognition result of the portion U11 for each detection unit 21, based on the position or orientation of each detection unit 21 (specifically, a position relationship of the detection range R21 for each detection unit 21), and recognizes an absolute position of this portion U11 within a space where each of the detection units 21 are arranged.

Note that, the target world model update unit 14 may perform recognition beforehand, based on prior calibration, data input from a user or the like, for the position relationship between each detection unit 21. Further, as another example, the target world model update unit 14 may automatically recognize the position relationship between each sensor, based on detection results of various types of sensors, an analysis of an image captured by an imaging unit or the like.

Here, an outline of an operation of the target world model update unit 14 will be described by referring to FIG. 7. FIG. 7 is an explanatory diagram for describing an outline of an operation of the target world model update unit 14. In FIG. 7, sensors A to C schematically show the detection units 21 included in each of the sensor boxes 20. Further, reference numerals P1 to P5 schematically show objects (for example, at least a part of a user's body) which become a detection target of each of the sensors.

In the example shown in FIG. 7, the objects P1 and P2 are present within the detection range of the sensor A. Further, the objects P2, P3, and P4 are present within the detection range of the sensor B. At this time, the object P2 is present within the detection ranges of both the sensors A and B. Similarly, the objects P4 and P5 are present within the detection range of the sensor C. At this time, the object P4 is present within the detection ranges of both the sensors B and C.

Further, in FIG. 7, data shown by reference numeral D10a shows objects recognized based on a detection result of the sensor A, and position information of these objects. Note that, at this time, the position information of each recognized object corresponds to relative position information (that is, relative space coordinates) with reference to the sensor A. Further, in the following description, there will be cases where the data shown by reference numeral D10a is called a "target world model D10a" corresponding to the sensor A.

For example, in the target world model D10a, an object positioned at relative space coordinates (Xa1, Ya1, Za1), shown by an identifier "IDA001", shows the object P1 within FIG. 7. Further, an object positioned at relative space coordinates (Xa2, Ya2, Za2), shown by an identifier "IDA002", shows the object P2 within FIG. 7.

Further, data shown by reference numeral D10b corresponds to a target world model D10b corresponding to the sensor B, which shows objects recognized based on a detection result of the sensor B, and position information of these objects. That is, in the target world model D10b, data shown by an identifier "IDB001" corresponds to the object P2. Similarly, data shown by an identifier "IDB002" corresponds to the object P3, and data shown by an identifier "IDB003" corresponds to the object P4.

Similarly, data shown by reference numeral D10c corresponds to a target world model D10c corresponding to the sensor C, which shows objects recognized based on a detection result of the sensor C, and position information of these objects. That is, in the target world model D10e, data shown by an identifier "IDC001" corresponds to the object P4. Data shown by an identifier "IDC002" corresponds to the object P5.

Note that, in the following description, in the case where simply showing a target world model for each sensor, without particularly distinguishing the target world models D10a to D10c, there will be cases where they are called a "target world model D10". Further, the target world model D10 for each sensor corresponds to control information showing a recognition result of the position or orientation of the portion U11 which becomes a target, for each detection unit 21, by the target recognition unit 12.

The target world model update unit 14 integrates the target world models D10 acquired for each of the detection units 21 (that is, for each of the sensors) based on a position relationship between each detection unit 21 recognized beforehand, and generates or updates a target world model D30, which shows an absolute position within a space where each of the detection units 21 are arranged.

As a specific example, the target world model update unit 14 maps respective detection ranges R21 of each of the detection units 21 as positions (absolute positions) within a space where each of the detection units 21 are arranged, based on a position relationship between each detection unit 21. Note that, hereinafter, there will be cases where the coordinates within a space where each of the detection units 21 are arranged are called "absolute space coordinates".

Also, the target world model update unit 14 maps the objects detected by each detection unit 21 within the absolute space coordinates, based on the target world model D10 for each detection unit 21. Note that, at this time, the target world model update unit 14 associates information showing the same object, from among the information of each object detected within mutually different detection units 21, based on a position relationship between each detection unit 21.

For example, in the case of the example shown in FIG. 7, the target world model update unit 14 recognizes that the object shown by the "identifier IDA002" within the target world model D10a, and the object shown by the "identifier IDB001" within target world model D10b, are the same object, based on a position relationship between the sensors A and B. Accordingly, the target world model update unit 14 associates the object shown by the "identifier IDA002", and the object shown by the "identifier IDB001", with information showing a common object P2, as a target object.

Similarly, the target world model update unit 14 recognizes that the object shown by the "identifier IDB003" within the target world model D10b, and the object shown by the "identifier IDC001" within target world model D10c, are the same object, based on a position relationship between the sensors B and C. Accordingly, the target world model update unit 14 associates the object shown by the "identifier IDB003", and the object shown by the "identifier IDC001", with information showing a common object P4, as a target object.

As described above, the target world model update unit 14 generates or updates the target world model D30 by integrating the target world models D10 successively acquired for each of the detection units 21 based on a position relationship between each detection unit 21, and accumulates this target world model D30 along a time series. In this way, a change along a time series of the position or orientation of a portion which becomes a target (for example, the portion U11 corresponding to a forearm) is shown, for example, within the target world model D30 accumulated along a time series.

Note that, portions with mutually similar shapes, such as the right arm and the left arm, are present within the portions of a human. On the other hand, there will be cases where it is difficult for such portions with mutually similar shapes to be determined, with only a recognition result (or estimation result) of the position or orientation of these portions. Accordingly, the target world model update unit 14 may determine portions with mutually similar shapes, based on a characteristic of movement (for example, a movement vector, a speed, an acceleration or the like) along a time series of these portions.

As a specific example, a change in the speed or acceleration of left-right movement tends to be mutually different, in the right arm and the left arm. Accordingly, the target world model update unit 14 may determine whether a portion recognized as an arm corresponds to the right arm or the left arm, based on a change in the speed or acceleration of the movement of this portion.

Further, as another example, a movable range (for example, a movable range with respect to the body trunk) tends to be mutually different, in the right arm and the left arm. Accordingly, the target world model update unit 14 may determine whether a portion recognized as an arm corresponds to the right arm or the left arm, based on a change in the vector of this portion.

Further, the target world model update unit 14 recognizes a movable range of a portion which becomes a target, based on the target world model D30 accumulated along a time series, and estimates the position or orientation of another portion, which becomes a base point of operation of this portion, based on the recognized movable range.

For example, in the example previously described with reference to FIG. 3, the target world model update unit 14 estimates the position or orientation of the portion U13 corresponding to an elbow, which becomes a base point of operation of the portion U11 corresponding to a forearm, based on a movable range of this portion U11. Further, the target world model update unit 14 estimates a movable range of the portion U13 corresponding to an elbow, based on a change along a time series of the position or orientation of this portion U13, and estimates the position or orientation of the portion U15 corresponding to a shoulder, which becomes a base point of operation of the portion U13, based on the estimated movable range. Further, the target world model update unit 14 estimates the position of the portion U21 corresponding to a mouth, based on an estimation result of the position or orientation of the portion U15 corresponding to a shoulder.

Also, the target world model update unit 14 updates the target world model D30, based on an estimation result of the position or orientation of other portions (for example, the portions U13, U15, and U21 shown in FIG. 3). In this way, information showing the position or orientation of other portions is recorded within the target world model D30. Note that, in particular, the section which estimates the position or orientation of these other portions, within the target world model update unit 14, corresponds to an example of an "estimation unit".

As described above, the target world model update unit 14 generates or updates the target world model D30. Note that, the target world model update unit 14 causes this generated or updated target world model D30 to be stored, for example, in the storage unit 40.

Further, the target world model update unit 14 generates integrated data for each user, by matching information showing the position or orientation along a time series of each portion with a model showing a user's body, based on a position relationship between each portion based on the target world model D30. Note that, hereinafter, there will be cases where data, for which information showing the position or orientation along a time series of each portion has been integrated for each user, is called a "human model D50".

For example, FIG. 8 is an explanatory diagram for describing an example of a data structure of a human model generated for each user.

As shown in FIG. 8, a header D51, and data D55 showing a change in the position or orientation along a time series for each portion, are associated in the human model D50. Position information D551 showing the position or orientation of a recognized or estimated portion is associated along a time series, for each of these portions, in the data D55.

Further, management information of the human model D50 is stored in the header D51. Identification information for identifying each human model D50, information (for example, an address) for extracting each data (for example, data D55) included within the human model D50 or the like are included in this management information.

Note that, at this time, the target world model update unit 14 determines whether each of the portions correspond to portions of the same user, or correspond to portions of mutually different users, in accordance with a position relationship between each portion based on the target world model D30, or a condition recognized in accordance with a detection result of each portion.

As a specific example, in the case where a distance between the portion U11 corresponding to the forearm of a right arm, and the portion U11' corresponding to the forearm of a left arm, are separated by a threshold or more, the target world model update unit 14 determines that these portions U11 and U11' are portions of mutually different users.

Further, as another example, in the case where a plurality of the portion U11 corresponding to the forearm of a right arm are present, the target world model update unit 14 determines that each of this plurality of the portion U11 are portions of mutually different users.

Further, the target world model update unit 14 may track movement along a time series for each portion, based on the target world model D30, and may determine whether each of the detected portions correspond to portions of the same user, or correspond to portions of mutually different users, in accordance with this tracking result.

As described above, the target world model update unit 14 generates or updates the human model D50, by integrating information of each portion included in the target world model D30 for each user.

Further, the human model D50 may have input data D53 from corresponding users associated, such as character information to which a voice input has been converted or the like.

In this case, for example, the target world model update unit 14 acquires information showing the orientation or width of the sound collection region R23 of each sound collection unit 23 (that is, the directivity of this sound collection unit 23), from the directivity control unit 15, which will be described below, and collates this acquired information with the position of a mouth estimated for each user. In this way, the target world model update unit 14 recognizes whether the directivity of each sound collection unit 23 is facing the direction of a user. That is, it becomes possible for the target world model update unit 14 to recognize whether each sound collection unit 23 is collecting a voice of a user.

Also, the target world model update unit 14 may associate information D531 showing a result of voice recognition (for example, character information to which a voice input has been converted), acquired for each sound collection unit 23 from the voice recognition unit 13, with the human model D50 corresponding to a user for whom the directivity of this sound collection unit 23 is facing, along a time series as the input data D53.

As described above, the target world model update unit 14 generates or updates the human model D50 for each user, by integrating information showing the position or orientation along a time series of each portion for each user, based on a position relationship between each portion based on the target world model D30. Also, the target world model update unit 14 causes this human model D50 generated or updated for each user to be stored in the storage unit 40.

The directivity control unit 15 controls the directivity of a directivity device, based on the human model D50 stored in the storage unit 40. For example, in the example shown in FIG. 6, the directivity control unit 15 controls the directivity of the sound collection unit 23 of each sensor box 20.

Specifically, the directivity control unit 15 recognizes the position or orientation of the portion U21 corresponding to a mouth, for each user, by monitoring an update condition of the human model D50 stored for each user in the storage unit 40. Also, the directivity control unit 15 controls the operation of the sound collection unit 23, so that the orientation of the sound collection region R23 of each sound collection unit 23 faces the direction of the recognized portion U21, based on the position or orientation of the portion U21 recognized for each user. Further, at this time, the directivity control unit 15 may control the width of the sound collection region R23 of each sound collection unit 23, in accordance with a recognition result of the position or orientation of the portion U21.

Further, the directivity control unit 15 may notify information showing a control result of the directivity of each sound collection unit 23 (that is, the orientation or width of the sound collection region R23 of each sound collection unit 23) to the target world model update unit 14. In this way, it becomes possible for the target world model update unit 14 to recognize whether the directivity of each sound collection unit 23 is facing the direction of a user.

The input analysis unit 16 has a configuration for recognizing the content of an operation performed for the information processing apparatus 1 by each user, based on the human model D50 stored in the storage unit 40.

Specifically, the input analysis unit 16 recognizes a change in the position or orientation of the portion U11 corresponding to a forearm, for each user, by monitoring an update condition of the human model D50 stored for each user in the storage unit 40, and recognizes the content of an operation by this user based on this recognition result.

In this case, the input analysis unit 16 acquires, beforehand, information showing the position of each display information within an operation screen, for example, from the output control unit 18, which will be described below. Note that, in the case where the output unit 30 is constituted as a so-called projector, such as shown in FIG. 1 and FIG. 2, the operation screen in the present description corresponds, for example, to the region R10 shown in FIG. 1 and FIG. 2.

Also, the input analysis unit 16 specifies the position within the operation screen to which a user indicates by the portion U11 (that is, display information displayed within the operation screen), by collating a recognition result of a change in the position or orientation of the portion U11, and information showing a position of each display information within the operation screen acquired from the output control unit 18. In this way, it becomes possible for the input analysis unit 16 to specify display information which a user has designated as an operation target, from among the display information displayed within the operation screen, and consequently, it becomes possible for the input analysis unit 16 to recognize that the content corresponding to this display information becomes an operation target.

Note that, in the case where the output unit 30 is constituted as a so-called projector, such as shown in FIG. 1 and FIG. 2, for example, the input analysis unit 16 may recognize the position where the region R10 is projected, by detecting the position of a projection surface 90 by a so-called ranging sensor or the like.

Further, the output unit 30 may be constituted as a device such as a so-called Liquid Crystal Display (LCD) apparatus, or an Organic Light Emitting Diode (OLED) display. Note that, in this case, it is needless to say that the position of the screen of this output unit 30 can be recognized, based on a relative position of the output unit 30 with respect to the main body 10 of the information processing apparatus 1.

Further, the input analysis unit 16 recognizes an operation (gesture) of a user using the portion U11, by collating a recognition result of a change in the position or orientation along a time series of this portion U11 with an operation pattern corresponding to a prescribed operation (gesture). In this way, it becomes possible for the input analysis unit 16 to recognize the content of an operation performed by the user.

Also, in the case where it is recognized that the recognized operation content is an operation for updating a display position or display state of an operation target, the input analysis unit 16 outputs information showing this operation target and operation content to the output control unit 18. In this way, it becomes possible for the output control unit 18 to update the operation screen, by controlling the display position or display state of this operation target in accordance with this operation content, based on information showing the acquired operation target and operation content.

Further, in the case where it is recognized that the recognized operation content is an operation for executing a function of the content which becomes an operation target, the input analysis unit 16 specifies this function which becomes a target, and outputs information showing the specified function to the processing execution unit 17. By receiving this output, the processing execution unit 17 executes the function (for example, an application) designated by the input analysis unit 16.

Further, as another example, the input analysis unit 16 may extract the input data D53, from the human model D50 stored for each user in the storage unit 40, and may recognize the content of an operation by a user, based on the extracted input data D53. Accordingly, hereinafter, an example of the operation of the input analysis unit 16 will be described, with an example of the case where a result of voice recognition is extracted, as the input data D53.

The input analysis unit 16 applies an analysis based on so-called natural language processing technology (for example, lexical analysis (morphological analysis), syntax analysis, semantic analysis or the like), to a result of voice recognition extracted from the input data D53 (that is, character information to which a voice input has been converted). In this way, it becomes possible for the input analysis unit 16 to recognize an instruction content from a user, based on a result of analysis based on natural language processing technology, for a result of the extracted voice recognition.

Also, in the case where it is recognized that the recognized instruction content is an instruction related to an update of the operation screen, the input analysis unit 16 outputs information showing this instruction content to the output control unit 18. In this way, it becomes possible for the output control unit 18 to update the operation screen, based on information showing the acquired instruction content.

Further, in the case where it is recognized that the recognized instruction content is an instruction for executing a prescribed function, the input analysis unit 16 outputs information showing this function to the processing execution unit 17. By receiving this output, the processing execution unit 17 executes the function (for example, an application) designated by the input analysis unit 16.

The processing execution unit 17 reads, from a prescribed storage region, data (for example, a library) for executing the function (for example, an application) designated from the input analysis unit 16. Note that, data for executing each function may be stored, for example, in the storage unit 40. It is needless to say that the location where this data is stored will not be particularly limited, if the processing execution unit 17 is capable of reading data for executing each function.

Also, the processing execution unit 17 executes the designated function by setting an acquired parameter to an input, based on the read data, and outputs an execution result of this function to the output control unit 18.

The output control unit 18 has a configuration for generating or updating the operation screen, and causing the output unit 30 to output this operation screen.

By receiving an execution result of various types of functions from the processing execution unit 17, the output control unit 18 presents display information (for example, an operation interface or the like) corresponding to these functions, presented by this execution result, within the operation screen. In this way, the operation screen is updated.

Further, in the case where information showing an instruction content relating to an update of the operation screen from the input analysis unit 16 (for example, information showing an operation target or operation content) is acquired, the output control unit 18 generates or outputs the operation screen based on this instruction content.

Also, the output control unit 18 causes the output unit 30 to output the generated or updated operation screen. In this way, it becomes possible for a user to recognize a result based on an operation by himself or herself via the screen by the operation output by the output unit 30.

Further, the output control unit 18 may output information showing the position of each display information within the operation screen to the input analysis unit 16. In this way, it becomes possible for the input analysis unit 16 to recognize the position of each display information within the operation screen.

Heretofore, an example of a functional configuration of the information processing apparatus 1 according to an embodiment has been described by referring to FIG. 6 to FIG. 8.

Note that, the functional configuration of the information processing apparatus 1 shown in FIG. 6 is merely an example, and this configuration will not be limited to the example shown in FIG. 6, if each of the functions of the above described information processing apparatus 1 are capable of being implemented. As a specific example, the sensor box 20 and the output unit 30 may be externally attached as external apparatuses to the information processing apparatus 1. Further, as another example, a configuration of at least a part, from among each of the configurations of the control unit 11, may be included in the sensor box 20 or the output unit 30. Further, a configuration of at least a part, from among each of the configurations of the control unit 11, may be included in an external apparatus (for example, a server or the like). Further, the detection unit 21 and the sound collection unit 23 may not necessarily be included in the same housing (for example, within the sensor box 20), and may be included in mutually different housings.

3. Processes

Next, an example of the flow of a series of processes of the information processing apparatus 1 according to an embodiment will be described by referring to FIG. 9, in particular, by focusing on a control of the directivity of the sound collection unit 23 by the information processing apparatus 1. FIG. 9 is a flow chart which shows an example of the flow of a series of processes of the information processing apparatus 1 according to an embodiment.
(Step S101)

The target recognition unit 12 acquires a detection result of an object (for example, at least a part of a user's body) present within a detection range R21 of the detection unit 21, from the detection unit 21 of each sensor box 20. The target recognition unit 12 extracts information of the portion U11 corresponding to a forearm, for example, by analyzing the acquired detection result, and recognizes the position or orientation of this portion U11 based on an extraction result.

Also, the target recognition unit 12 outputs control information showing a recognition result of the position or orientation of the portion U11 which corresponds to a forearm to the target world model update unit 14, for each detection unit 21 (or, for each sensor box 20).

The target world model update unit 14 acquires control information (i.e. target world model D10) showing a recognition result of the position or orientation of the portion U11 which becomes a target, from the target recognition unit 12, for each detection unit 21.

The target world model update unit 14 integrates the target world models D10 acquired for each of the detection units 21 (that is, for each of the sensors) based on a position relationship between each detection unit 21 recognized beforehand, and generates or updates a target world model D30, which shows an absolute position within a space where each of the detection units 21 are arranged.

As a specific example, the target world model update unit 14 maps respective detection ranges R21 of each of the detection units 21 as positions (absolute positions) within a space where each of the detection units 21 are arranged, based on a position relationship between each detection unit 21.

Also, the target world model update unit 14 maps the portions detected by each detection unit 21 within the absolute space coordinates, based on the target world model D10 for each detection unit 21. Note that, at this time, the target world model update unit 14 associates information showing the same portion, from among the information of each portion detected within mutually different detection units 21, based on a position relationship between each detection unit 21.

As described above, the target world model update unit 14 generates or updates the target world model D30 by integrating the target world models D10 successively acquired for each of the detection units 21 based on a position relationship between each detection unit 21, and accumulates this target world model D30 along a time series.
(Step S103)

Further, the target world model update unit 14 estimates whether the detected portion U11 corresponding to a forearm corresponds to either the left or right arm, based on a characteristic of movement (for example a movement vector, a speed, an acceleration or the like) along a time series of this portion U11.

As a specific example, the target world model update unit 14 may determine whether a portion recognized as an arm corresponds to either of the right arm and the left arm, based on a change in the speed or acceleration of movement of this portion. Further, as another example, the target world model update unit 14 may determine whether a portion recognized as an arm corresponds to either of the right arm and the left arm, based on a change in a vector of this portion. Note that, the process shown as step S103 may be executed in parallel with the process relating to step S101, or the processes relating to steps S105 and S107, which will be described below.
(Step S105)

Further, the target world model update unit 14 recognizes a movable range of a portion which becomes a target, based on the target world model D30 accumulated along a time series, and estimates the position or orientation of another portion, which becomes a base point of operation of this portion, based on the recognized movable range.

For example, the target world model update unit 14 estimates the position or orientation of the portion U13 corresponding to an elbow, which becomes a base point of movement of the portion U11 corresponding to a forearm, based on a movable range of this portion U11.
(Step S107)

Further, the target world model update unit 14 estimates a movable range of the portion U13 corresponding to an elbow, based on a change along a time series of the position or orientation of this portion U13, and estimates the position or orientation of the portion U15 corresponding to a shoulder, which becomes a base point of movement of the portion U13, based on the estimated movable range.
(Step S109)

Next, the target world model update unit 14 estimates the position of the portion U21 corresponding to a mouth, based on an estimation result of the position or orientation of the portion U15 corresponding to a shoulder.
(Step S111)

Then, the target world model update unit 14 updates the target world model D30, based on an estimation result of the position or orientation of other portions (for example, the portions U13, U15, and U21 shown in FIG. 3). In this way, information showing the position or orientation of other portions is recorded within the target world model D30.

As described above, the target world model update unit 14 generates or updates the target world model D30. Note that, the target world model update unit 14 causes this generated or updated target world model D30 to be stored, for example, in the storage unit 40.

Further, the target world model update unit 14 generates the integrated human model D50 for each user, by matching information showing the position or orientation along a time series of each portion with a model showing a user's body, based on a position relationship between each portion based on the target world model D30.

Note that, at this time, the target world model update unit 14 determines whether each of the portions correspond to portions of the same user, or correspond to portions of mutually different users, in accordance with a position relationship between each portion based on the target world model D30, or a condition recognized in accordance with a detection result of each portion.

As a specific example, in the case where a distance between the portion U11 corresponding to the forearm of a right arm, and the portion U11' corresponding to the forearm of a left arm, are separated by a threshold or more, the target world model update unit 14 determines that these portions U11 and U11' are portions of mutually different users.

Further, as another example, in the case where a plurality of the portion U11 corresponding to the forearm of a right arm are present, the target world model update unit 14 determines that each of this plurality of the portion U11 are portions of mutually different users.

Further, the target world model update unit 14 may track movement along a time series for each portion, based on the target world model D30, and may determine whether each of the detected portions correspond to portions of the same user, or correspond to portions of mutually different users, in accordance with this tracking result.

As described above, the target world model update unit 14 generates or updates the human model D50, by integrating information of each portion included in the target world model D30 for each user. Then, the target world model update unit 14 causes this human model D50 generated or updated for each user to be stored in the storage unit 40. (Step S113)

The directivity control unit 15 controls the directivity of a prescribed directivity device, such as the sound collection unit 23 of each sensor box 20 or the like, based on the human model D50 stored in the storage unit 40.

Specifically, the directivity control unit 15 recognizes the position or orientation of the portion U21 corresponding to a mouth, for each user, by monitoring an update condition of the human model D50 stored for each user in the storage unit 40. Also, the directivity control unit 15 controls the operation of the sound collection unit 23, so that the orientation of the sound collection region R23 of each sound collection unit 23 faces the direction of the recognized portion U21, based on the position or orientation of the portion U21 recognized for each user. Further, at this time, the directivity control unit 15 may control the width of the sound collection region R23 of each sound collection unit 23, in accordance with a recognition result of the position or orientation of the portion U21. (Step S115)

As described above, as long as an end of the series of processes has not been instructed (step S115, NO), the information processing apparatus 1 successively monitors a change in the position or orientation of the portion U21 corresponding to a mouth of each user, and controls the directivity of each sound collection unit 23 based on a monitoring result. By such a configuration, it becomes possible for the sound collection unit 23 to more accurately collect a voice input from a user who becomes a target (for example, a user recognized as an operator).

Then, when an end of the series of processes is instructed (step S115, YES), the information processing apparatus 1 ends the process relating to recognition and estimation of the position or orientation of each portion of a user, and the process related to a control of the directivity of each sound collection unit 23, which have been described above.

Heretofore, an example of the flow of a series of processes of the information processing apparatus 1 according to an embodiment has been described by referring to FIG. 9.

4. Modified Examples

Next, modified examples of the information processing apparatus according to an embodiment will be described.

4.1. Modified Example 1: Example of a Directivity Control

First, examples of a directivity control by the information processing apparatus 1 according to an embodiment will be described, as a modified example 1.

For example, FIG. 10 is an explanatory diagram for describing an example of the operation of the information processing apparatus 1 according to the modified example 1, and shows an example of the case where the information processing apparatus 1 controls the width of the sound collection region R23 of each sound collection unit 23, in accordance with an estimation result of the position of a mouth of each of users Ua and Ub.

As described previously, the information processing apparatus 1 according to an embodiment estimates the position or orientation of other portions (for example, an elbow, shoulder, mouth or the like), based on a change in the position or orientation along a time series of a portion (for example, a forearm) recognized based on a detection result by the detection unit 21. Accordingly, in the information processing apparatus 1 according to an embodiment, for example, the reliability of an estimation result of the position or orientation of the portion U13 corresponding to an elbow improves, as the sample data showing a recognition result of the position or orientation of the portion U11 corresponding to a forearm increases (in particular, as a change in the position or orientation increases).

On the other hand, in the information processing apparatus 1 according to an embodiment, from the viewpoint of the above described characteristic of control, for example, in the case where there is not a lot of sample data showing a recognition result of the position or orientation of the portion U11 corresponding to a forearm, there will be cases where the reliability of an estimation result of the position or orientation of the portion U13 corresponding to an elbow becomes low. This is similar for the case where the position or orientation of the portion U15 corresponding to a shoulder is estimated, based on an estimation result of the portion U13 corresponding to an elbow, and the case where the position or orientation of the portion U21 corresponding to a mouth is estimated, based on an estimation result of the position or orientation of the portion U15 corresponding to a shoulder.

Accordingly, in the example shown in FIG. 10, the information processing apparatus 1 controls the directivity of a device which becomes a target (for example, the sound collection unit 23), in accordance with the reliability of an estimation result of the position or orientation of the portion which becomes a reference of directivity control. For example, the example shown in FIG. 10 shows the case where an estimation result of the position or orientation of the user Ua's mouth has a reliability higher than that of an estimation result of the position of the user Ub's mouth.

In the example shown in FIG. 10, since the reliability of an estimation result of the position and orientation of the user Ua's mouth is high, the information processing apparatus 1 controls the directivity of the sound collection unit 23 of the sensor box 20a side, which collects a voice input from this user Ua, so that the width of the sound collection region R23a of this sound collection unit 23 becomes narrow. In this way, it becomes possible for the information processing apparatus 1 to more accurately collect a voice input from the user Ua via the sound collection unit 23 of the sensor box 20a side.

Further, since the reliability of an estimation result of the position and orientation of the user Ub's mouth is low, the information processing apparatus 1 controls the directivity of the sound collection unit 23 of the sensor box 20b side, which collects a voice input from this user Ub, so that the width of the sound collection region R23b of the sound collection unit 23 becomes wide. In this way, even in a case such as where the actual position and orientation of the user Ub's mouth is different to an estimation result, it becomes possible for the information processing apparatus 1 to collect a voice input from this user Ub via the sound collection unit 23 of the sensor box 20b side.

Further, the information processing apparatus 1 may present, to a user, information showing the reliability of an estimation result of the position of a mouth. For example, in the example shown in FIG. 10, the information processing apparatus 1 presents, to each user, display information v21 and v21a showing the reliability of an estimation result of the position of a mouth of each of the users Ua and Ub, by projecting on a region R10.

Specifically, in the example shown in FIG. 10, the information processing apparatus 1 controls a display of corresponding display information, so that this display information is presented smaller as the reliability of an estimation result of the position of a mouth increases.

More specifically, since the reliability of an estimation result of the position and orientation of the user Ua's mouth is high, the information processing apparatus 1 presents display information v21a corresponding to the sensor box 20a, which collects a voice input from this user Ua, so as to become smaller in accordance with the reliability. In this way, it becomes possible for each user to visually recognize, for example, that the directivity of the sound collection unit 23 of the sensor box 20a is controlled, so that the reliability of an estimation result of the position and orientation of the user Ua's mouth is high, and the sound collection region R23a of this sound collection unit 23 becomes narrow.

Since the reliability of an estimation result of the position and orientation of the user Ub's mouth is low, the information processing apparatus 1 presents display information v21b corresponding to the sensor box 20b, which collects a voice input from this user Ua, so as to become larger in accordance with the reliability. In this way, it becomes possible for each user to visually recognize, for example, that the directivity of the sound collection unit 23 of the sensor box 20b is controlled, so that the reliability of an estimation result of the position and orientation of the user Ub's mouth is low, and the sound collection region R23b of this sound collection unit 23 becomes wide.

Further, FIG. 11 and FIG. 12 are explanatory diagrams for describing other examples of the operation of the information processing apparatus 1 according to the modified example 1. In the examples shown in FIG. 11 and FIG. 12, the information processing apparatus 1 controls the directivity of the sound collection unit 23 of each of the sensor boxes 20a and 20b, in accordance with whether or not the user who is performing an operation is able to be specified, from among the users Ua and Ub.

Note that, the information processing apparatus 1 may recognize whether either of the users Ua and Ub is performing an operation, in accordance with a detection result of a change in the position or orientation of a portion (for example, the forearm) which becomes a target of each of the users Ua and Ub. In this case, the information processing apparatus 1 may recognize the user of the side where the position or orientation of the portion which becomes a target has changed larger than a prescribed threshold, for example, as an operator.

Further, the information processing apparatus 1 may recognize whether either of the users Ua and Ub is performing an operation, for example, in accordance with an acquisition condition of a voice input from each of the users Ua and Ub. In this case, the information processing apparatus 1 may recognize the user of the side where a voice input has been acquired as an operator. Note that, at this time, the information processing apparatus 1 may recognize an acquisition condition of a voice input from each user, for example, in accordance with the orientation of the sound collection region R23 of each sound collection unit 23, and a sound collection condition of sound information from each sound collection unit 23 (whether or not a voice input has been collected).

Here, FIG. 11 will be referred to. FIG. 11 shows an example of the case where the information processing apparatus 1 is able to recognize that there are users Ua and Ub of a plurality of people present, and is able to recognize that the user Ua is an operator. Note that, in FIG. 11, reference numeral R23a shows a sound collection region of the sound collection unit 23 of the sensor box 20a side. Similarly, reference numeral R23b shows a sound collection region of the sound collection unit 23 of the sensor box 20b side.

In the example shown in FIG. 11, the information processing apparatus 1 narrows the width of each of the sound collection regions R23a and R23b, and controls the directivity of the sound collection unit 23 of each of the sensor boxes 20a and 20b, so that each of these sound collection regions R23a and R23b face the user Ua, who is an operator, side. By such a control, it becomes possible for the information processing apparatus 1 to improve the recognition accuracy of a voice input from the user Ua, who is an operator.

Next, FIG. 12 will be referred to. FIG. 12 shows the case where the information processing apparatus 1 is able to recognize that there are users Ua and Ub of a plurality of people present, and that it is difficult to recognize which of the users Ua and Ub is an operator. As a specific example, there will be cases where it is difficult for the information processing apparatus 1 to recognize which of the users Ua and Ub is an operator, under a condition where both of the users Ua and Ub are speaking. Note that, in FIG. 12, reference numerals R23a and R23b are similar to the example shown in FIG. 11.

In the example shown in FIG. 12, the information processing apparatus 1 controls the directivity of the sound collection unit 23 of each of the sensor boxes 20a and 20b, so that the width of the sound collection regions R23a and R23b becomes wider. By such a control, it becomes possible for the information processing apparatus 1 to collect a voice input from a user who is speaking, even if one or both of the users Ua and Ub are speaking.

Further, as another example, in the case where it is difficult to recognize whether either of the users Ua and Ub is an operator, the information processing apparatus 1 may control the directivity of each sound collection unit 23, so that each sound collection unit 23 collects a voice input from respectively different users. Note that, in this case, as described with reference to FIG. 10, the width of the sound collection region R23 of each sound collection unit 23 may be controlled, in accordance with the reliability of an estimation result of the position or orientation of a portion which becomes a target for each user.

Note that, the example described above is merely an example, and the content of this control, and the type of device which becomes a control target, will not be particularly limited, if the information processing apparatus 1 can control the directivity of a prescribed device, in accordance with an estimation result of the position or orientation of a prescribed portion.

Heretofore, examples of a directivity control by the information processing apparatus 1 according to an embodiment have been described by referring to FIG. 10 to FIG. 12, as the modified example 1.

4.2. Modified Example 2: Example of a System Configuration

Next, an example of a system configuration of the information processing apparatus according to an embodiment will be described by referring to FIG. 13 and FIG. 14, as a modified example 2. FIG. 13 and FIG. 14 are explanatory diagrams for describing an outline of the information processing apparatus according to the modified example 2. Note that, in the following description, in order to distinguish the information processing apparatus according to the modified example 2 from the information processing apparatus 1 according to the previous description, there will be cases where the information processing apparatus according to the modified example 2 is called an "information processing apparatus 1'".

For example, FIG. 13 shows an example of a schematic configuration of the information processing apparatus 1' according to the modified example 2. As shown in FIG. 13, the information processing apparatus 1' according to the modified example 2 includes a sensor box 20, an output unit 30 for presenting display information, and a main body 10 in which a control unit, which controls various types of operations of the information processing apparatus 1', is included. Note that, the main body 10, the sensor box 20, and the output unit 30 shown in FIG. 13 correspond to the main body 10, the sensor box 20, and the output unit 30 in the information processing apparatus 1 described with reference to FIG. 1. Note that, in the present description, the sensor box 20 includes a detection unit 21 for detecting the position or orientation of a portion of at least a part of a user's body, and a sound collection unit 23 for collecting a voice input from a user, similar to the information processing apparatus 1 according to the previous description (refer to FIG. 1 and FIG. 2).

In the example shown in FIG. 13, the information processing apparatus 1' is set, for example, above a table 140 or the like, so as to face the top surface side of this table 140. The information processing apparatus 1' sets the top surface of the table 140 to a projection surface, presents display information to a user, by projecting this display information to the output unit 30, and receives an operation, from a user who uses the information processing apparatus 1', for the projected display information. Note that, reference numeral 110 shows a region (that is, a projection surface) on which information (that is, display information) is projected by the output unit 30.

The sound collection unit 23 included in the sensor box 20 can be constituted by a sound collection device for collecting sound information such as a voice spoken by a user, or environment sounds of the environment in which the information processing apparatus 1' is placed, such as a so-called microphone.

Further, the detection unit 21 included in the sensor box 20 recognizes an operation content of a user who uses the information processing apparatus 1', a shape or pattern of art object placed on the table 140 or the like. For example, in the example shown in FIG. 13, the detection unit 21 is set so that a detection range is formed towards above the top surface of the table 140 from above this table 140. That is, the detection unit 21 is included separated from the table 140 which becomes a target for which information is displayed.

The detection unit 21 can be constituted by a so-called ranging sensor, similar to the information processing apparatus 1 according to the previous description. Further, as another example, the detection unit 21 may be constituted, for example, by a camera which captures the table 140 with one imaging optical system (for example, a series of lenses), or a stereo camera capable of recording information of a depth direction by capturing the table 140 with two imaging optical systems. Note that, in the present description, the detection unit 21 is described as being constituted as a so-called stereo camera.

In the case where a stereo camera is used as the detection unit 21, a visible optical camera, an infrared camera or the like can be applied, for example, to this stereo camera. By using a stereo camera as the detection unit 21, it becomes possible for the detection unit 21 to acquire depth information. By having the detection unit 21 acquire depth information, it becomes possible for the information processing apparatus 1' to detect, for example, a real object such as a hand or an object placed on the table 140. Further, by having the detection unit 21 acquire depth information, it becomes possible for the information processing apparatus 1' to detect contact and proximity of an operating body such as a user's hand to the table 140, or separation of an operating body from the table 140.

By such a configuration, it becomes possible for the information processing apparatus 1' to recognize an operation by an operating body such as a hand by a user, for display information projected on the region R10 on the top surface of the table 140, and to execute various types of functions in accordance with the content of this operation.

Further, since display information projected on the region R10 is operated, based on a detection result by the above described detection unit 21, it is possible for the information processing apparatus 1' to recognize the position or orientation of a portion such as a hand, arm or the like which operates within the detection region R21 of the detection unit 21. That is, it is possible for the information processing apparatus 1' according to the modified example 2 to estimate the position or orientation of the portion U21 corresponding to a mouth, based on a change in the position or orientation along a time series of the portion U11 corresponding to a forearm, for example, similar to the information processing apparatus 1 according to the previous description (refer to FIG. 1 and FIG. 2).

For example, FIG. 14 is an explanatory diagram for describing an outline of the information processing apparatus 1' according to the modified example 2, and shows an example of a position relationship between the region R10 and a user, in the case where looking down at the top surface of the table 140 from above in a vertical direction.

As shown in FIG. 14, in the case where the user Ub operates display information projected on the region R10 by an operating body such as a hand or an arm, the information processing apparatus 1' can recognize the position or orientation of the portion U11 corresponding to this user Ub's forearm, based on a detection result by the detection unit 21. In this way, it becomes possible for the information processing apparatus 1' to estimate the position or orientation of the portion U21 corresponding to this user's mouth, based on a recognition result of the position or orientation of this portion U11.

Specifically, the information processing apparatus 1' recognizes a movable range of the portion U11 corresponding to a forearm, based on a change along a time series of the position or orientation of this portion U11, and estimates the position or orientation of the portion U13 corresponding to an elbow, which becomes a base point of movement of the portion U11, based on the recognized movable range. Further, the information processing apparatus 1' estimates a movable range of the portion U13 corresponding to an elbow, based on a change along a time series of the position or orientation of this portion U13, and estimates the position or orientation of the portion U15 corresponding to a shoulder, which becomes a base point of movement of the portion U13, based on the estimated movable range. Next, the information processing apparatus 1' can estimate the position of the portion U21 corresponding to a mouth, based on an estimation result of the position or orientation of the portion U15 corresponding to a shoulder.

Also, the information processing apparatus 1' may control the directivity of the sound collection unit 23, so that the sound collection region R23 of the sound collection unit 23 faces the direction of the portion U21 corresponding to a mouth, based on an estimation result of the position or orientation of this portion U21.

In particular, in the information processing apparatus 1' according to the modified example 2, shown in FIG. 13 and FIG. 14, the portion capable of recognizing the position or orientation based on a detection result of the detection unit 21 is limited to the portion U11 corresponding to a forearm or the like, and there will be cases where it is difficult to directly recognize the portion U21 corresponding to a mouth or the like. Even under such a condition, it becomes possible for the information processing apparatus 1' according to the modified example 2 to estimate the position or orientation of the portion U21 corresponding to a mouth, which is difficult to directly recognize, based on a recognition result of the position or orientation of this portion U11, and to control the directivity of the sound collection unit 23 based on this estimation result.

Heretofore, an example of a system configuration of the information processing apparatus according to an embodiment has been described by referring to FIG. 13 and FIG. 14, as the modified example 2.

4.3. Modified Example 3: Application Example to an Onboard Apparatus

Next, an example of the case where the information processing apparatus 1 is applied to an onboard apparatus, as an applicable example of the information processing apparatus 1 according to an embodiment, will be described by referring to FIG. 15 and FIG. 16, as a modified example 3. FIG. 15 and FIG. 16 are explanatory diagrams for describing an outline of the information processing apparatus 1 according to the modified example 3.

For example, FIG. 15 shows an example of a schematic configuration of the information processing apparatus 1 according to the modified example 3. The information processing apparatus 1 according to the modified example 3 is constituted for a user to be capable of operating, by moving a visual line, based on a movement of this visual line.

In FIG. 15, reference numeral 31 shows an imaging unit for capturing a region near the eyes of a user, in order for the information processing apparatus 1 according to the modified example 3 to detect a movement of this user's visual line. Accordingly, it is desirable for the imaging unit 31 to have a performance capable of capturing an image with a frame rate capable of recognizing a change in a visual line. Note that, reference numeral R30 schematically shows an imaging region of the imaging unit 31.

Further, reference numerals 25a and 25b show imaging units for capturing a user's arms or body (in particular, the upper body), in order for the information processing apparatus 1 according to the modified example 3 to recognize a movement of the user's arms.

For example, the imaging unit 25a is arranged so that an image of the upper body of a user Ua sitting in a driver's seat can be captured from in front of this user Ua. Reference numeral R25a schematically shows an imaging region of the imaging unit 25a. Note that, it is desirable for the imaging unit 25 to have a viewing angle to the extent that the upper body, in particular, the arms and shoulders, of the user Ua sitting in a driver's seat is placed within the imaging region R25a.

Further, the imaging unit 25b is arranged so that an image of the user Ua sitting in a driver's seat can be captured from above in a vertical direction. Reference numeral R25b schematically shows an imaging region of the imaging unit 25b. Note that, it is desirable for the imaging unit 25b to have a viewing angle to the extent that the arms of the user Ua sitting in a driver's seat and gripping the steering wheel are placed within the imaging region R25b.

Based on a configuration such as described above, the information processing apparatus 1 according to the modified example 3 recognizes a change along a time series of the position or orientation of the user Ua's arms, based on an image captured in each of the imaging units 25a and 25b. Further, the information processing apparatus 1 estimates the position of this user Ua's shoulders, based on a recognition result of a change in the position or orientation of the user Ua's arms, and next estimates the position of the user Ua's eyes, based on an estimation result of the position of the shoulders.

Also, the information processing apparatus 1 controls the orientation of the imaging unit 31, so that the imaging region R30 of this imaging unit 31 faces the direction of the user Ua's eyes, based on an estimation result of the position of the user Ua's eyes.

By such a configuration, it becomes possible for the information processing apparatus 1 according to the modified example 3 to apply an imaging device with a comparatively narrow viewing angle as the imaging unit 31. Further, since it is possible to comparatively narrow down a captured region, by the imaging unit 31, it becomes possible for the information processing apparatus 1 according to the modified example 3 to reduce the load of the process relating to an analysis for recognizing a change in a visual line from this image, compared to the case where capturing an image with a wider range.

Note that, in the example shown in FIG. 15, the images captured by the imaging units 25a and 25b are used for recognizing a change along a time series of the position and orientation of the user Ua's arms. Accordingly, it may not be necessary to use imaging units with a high frame rate, as the imaging units 25a and 25b, if having a performance capable of capturing an image with a frame rate to the extent that a change in the position and orientation of the user Ua's arms can be recognized.

Further, the setting example of the imaging units 25a and 25b shown in FIG. 15 is merely an example, and the setting position of the imaging units for capturing images will not be particularly limited, if a change in the position and orientation of the user Ua's arms can be recognized based on these captured images.

For example, FIG. 16 shows a setting example of an imaging unit which captures an image for recognizing a change in the position and orientation of the user Ua's arms. In the example shown in FIG. 16, an imaging unit 29 for capturing an image of this user's arms is included, in a wearable device 27 set on the user's neck. Reference numeral R29 schematically shows an imaging region of the imaging unit 29.

In the example shown in FIG. 16, the imaging unit 29 is held so as to face the direction towards the front side of this user Ua, near the user Ua's chest, by the wearable device 27. In this way, in the case where the user Ua is sitting in a driver's seat and gripping the steering wheel, it becomes possible for the imaging unit 29 to capture an image of this user Ua's arms extended forward, from near this user Ua's chest.

Note that, in the example described above, while an example has been described where the information processing apparatus 1 controls the directivity of the imaging unit 31 based on an estimation result of the position of a user's eyes, the portion which becomes an estimation target of the position or orientation, and the device which becomes a target of a directivity control, are not particularly limited.

As a specific example, the information processing apparatus 1 in the modified example 3 may include a sound collection unit for the user Ua to perform a voice input, and may control the directivity of this sound collection unit. In this case, the information processing apparatus 1 may estimate the position of the user Ua's mouth, based on a change along a time series of the position or orientation of this user Ua's arms, and may control the directivity of the sound collection unit, so that a sound collection region of this sound collection unit faces the direction of the user Ua's mouth, based on this estimation result.

Heretofore, an example of the case where the information processing apparatus 1 is applied to an onboard apparatus, as an application example of the information processing apparatus 1 according to an embodiment, has been described by referring to FIG. 15 and FIG. 16, as the modified example 3.

In particular, it is often the case where, in the space within a vehicle, the position capable of setting various types of detection devices (for example, the imaging units 25a and 25b shown in FIG. 15) is limited, and there will be cases where it is difficult to directly detect the position or orientation of a specific portion such as the user Ua's eyes, mouth or the like. Under such a condition, if a change along a time series of the position or orientation of a portion of at least a part of the user Ua's body can be recognized, it becomes possible for the information processing apparatus 1 according to an embodiment to estimate the position or orientation of the user Ua's eyes or mouth, based on this recognition result.

Note that, while a case has been described above where the user Ua, who becomes an estimation target of the position or orientation of a specific portion such as the eyes or mouth, is a driver, the user who becomes a target is not necessarily limited to a driver. For example, an estimation of the position or orientation of a specific portion such as the eyes or mouth of a passenger other than the driver may be performed, and the directivity of a device such as an imaging unit or a sound collection unit may be controlled, based on this estimation result. Note that, it is needless to say that, in the case where a passenger other than the driver is set to a target, it is desirable for various types of detection devices to be set, so that a change along a time series of the position or orientation of this passenger's arms can be detected. As a specific example, an imaging unit with a comparatively wide viewing angle may be included in the roof within a car, and the information processing apparatus 1 may recognize a change in the position or orientation of a passenger's arms, based on an image captured by this imaging unit.

5. Hardware Configuration

Next, an example of a hardware configuration of the information processing apparatus 1 according to embodiments of the present disclosure will be described by referring to FIG. 17. FIG. 17 is a figure which shows an example of a hardware configuration of the information processing apparatus 1 according to an embodiment of the present disclosure.

As shown in FIG. 17, the information processing apparatus 1 according to an embodiment includes a processor 901, a memory 903, a storage 905, an operation device 907, a notification device 909, a detection device 911, a sound collection device 913, and a bus 917. Further, the information processing apparatus 1 may include a communication device 915.

The processor 901 may be, for example, a Central Processing Unit (CPU), a Graphics Processing Unit (GPU), a Digital Signal Processor (DSP), or a System on Chip (SoC), and executes various processes of the information processing apparatus 1. It is possible for the processor 901 to be constituted, for example, by an electronic circuit for executing various types of calculation processes. Note that, each of the previously described configurations of the control unit 11 can be implemented by the processor 901.

The memory 903 includes a Random Access Memory (RAM) and a Read Only Memory (ROM), and stores programs and data executed by the processor 901. The storage 905 can include a storage medium such as a semiconductor memory or a hard disk. For example, the previously described storage unit 40 can be implemented by at least one of the memory 903 and the storage 905, or a combination of both.

The operation device 907 has a function which generates an input signal for a user to perform a desired operation. The operation device 907 can be constituted, for example, as a touch panel. Further, as another example, the operation device 907 may be constituted, for example, from an input unit for a user to input information such as buttons, switches or a keyboard, an input control circuit which generates an input signal based on an input by a user, and supplies the generated input signal to the processor 901 or the like.

The notification device 909 is an example of an output device, and may be, for example, a device such as a Liquid Crystal Display (LCD) apparatus, or an Organic Light Emitting Diode (OLED) display or the like. In this case, the notification device 909 can notify prescribed information to a user, by displaying a screen. Further, the notification device 909 may notify this information to a user, by projecting prescribed information on a projection surface, such as a so-called projector. Note that, the previously described output unit 30 can be implemented by the notification device 909.

Further, the notification device 909 may be a device which notifies prescribed information to a user, by outputting a prescribed sound signal, such as a speaker or the like.

Further, the above described example of the notification device 909 is merely an example, and the state of the notification device 909 will not be limited, if prescribed information is capable of being notified to a user. As a specific example, the notification device 909 may be a device which notifies prescribed information to a user, by a lighting or flickering pattern, such as a Light Emitting Diode (LED). Further, the notification device 909 may be a device which notifies prescribed information to a user, by vibrating, such as a so-called vibrator.

The sound collection device 913 is a device for collecting a voice spoken from a user or sounds of the surrounding environment, and acquiring these as sound information (sound signals). Further, the sound collection device 913 may acquire data showing an analogue sound signal, which shows the collected voice or sounds, as sound information, may convert this analogue sound signal into a digital sound signal, and may acquire data showing the digital sound signal after conversion as sound information. Note that, the previously described sound collection unit 23 can be implemented by the sound collection device 913.

The communication device 915 is a communication device included in the information processing apparatus 1, and communicates with an external apparatus via a network. The communication device 915 is a wired or wireless communication interface. In the case where the communication device 915 is constituted as a wireless communication interface, this communication device 915 may include a communication antenna, a Radio Frequency (RF) circuit, a baseband processor or the like.

It is possible for the communication device 915 to have a function which performs various types of signal processes to a signal received from an external apparatus, and supply a digital signal generated from a received analogue signal to the processor 901.

The detection device 911 is a device for detecting various types of conditions. The detection device 911 can be constituted, for example, by a so-called ranging sensor, such as a stereo image sensor or the like. Note that, the previously described detection unit 21 can be implemented by the detection device 911.

The bus 917 mutually connects the processor 901, the memory 903, the storage 905, the operation device 907, the notification device 909, the detection device 911, the sound collection device 913, and the communication device 915. The bus 917 may include a plurality of various types of buses.

Further, a program for causing hardware such a processor, a memory, and a storage built into a computer to exhibit functions the same as the configurations of the above described information processing apparatus 1 can be created. Further, a recording medium can also be provided which records this program and is capable of performing reading to the computer.

6. Summary

Heretofore, as described above, the information processing apparatus 1 according to an embodiment estimates the position or orientation of a portion of at least a part of a user's body trunk, based on a change in the position or orientation along a time series of a portion of at least a part of this user's limbs. By such a configuration, it becomes possible for the information processing apparatus 1 according to an embodiment to estimate the position or orientation of a specific portion, based on a recognition result of a change in the position or orientation of another portion, even under a condition where it is difficult to directly recognize the position or orientation of this specific portion.

Further, in the information processing apparatus 1 according to an embodiment, the reliability of an estimation result of the position or orientation of another portion improves, based on a change in the position or orientation of a portion of at least a part, as the sample data showing a recognition result (or, an estimation result) of the position or orientation of this portion of this part increases. Accordingly, by continuously monitoring a change in the position or orientation of a portion of at least a part such as a user's arm, it becomes possible for the information processing apparatus 1 according to an embodiment to further improve an estimation accuracy of the position or orientation of other portions such as this user's eyes or mouth.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

Additionally, the present technology may also be configured as below.

(1)

An apparatus including:
circuitry configured to
determine a position of a mouth of a user that is distinguishable among a plurality of people, and control an acquisition condition for collecting a sound based on the determined position of the user's mouth.

(2)

The apparatus according to (1), wherein the acquisition condition includes orientation or width of at least one sound collection region.

(3)

The apparatus according to (1) or (2),
wherein the circuitry is further configured to:
detect a body part of the user performing a gesture; and
determine a relative position or a relative orientation of at least one portion of the user's body part at a plurality of points during the gesture,
wherein the position of the user's mouth is determined as an estimate based on the determined relative position or the determined relative orientation of the at least one portion of the user's body part.

(4)

The apparatus according to any of (1) to (3), wherein the detected body part includes an arm of the user and the at least one portion of the user's body part includes one or more of a hand, a forearm, an elbow, and a shoulder of the user.

(5)

The apparatus according to any of (1) to (4), wherein the relative position or the relative orientation of the at least one portion of the user's body part is determined based on the relative position or the relative orientation of another one of the at least one portion of the user's body part.

(6)

The apparatus according to any of (1) to (5), wherein the determined position of the user's mouth is set to be a target position of sound collection, such that the orientation of the at least one sound collection region is directed toward the target position.

(7)

The apparatus according to any of (1) to (6), wherein the circuitry is further configured to determine a position of a mouth of each of a plurality of users distinguishable among the plurality of people.

(8)

The apparatus according to any of (1) to (7), wherein the determined position of each mouth of the plurality of users is set to be a target position of sound collection, such that the orientation of each sound collection region is directed toward one of the plurality of target positions.

(9)

The apparatus according to any of (1) to (8), wherein the circuitry is further configured to control at least one of an imaging sensor to determine the position of the user's mouth and a sound sensor to collect the sound according to the controlled acquisition condition.

(10)

The apparatus according to any of (1) to (9), wherein a number of sound sensors is equal to or greater than a number of the plurality of users.

(11)

The apparatus according to any of (1) to (10), wherein each sound sensor collects sound within a region of the at least one sound collection region having an orientation directed toward one of the plurality of target positions.

(12)

The apparatus according to any of (1) to (11), wherein the acquisition condition of the at least one sound collection region is determined based on a reliability of an estimate of one or more of the plurality of target positions.

(13)

The apparatus according to any of (1) to (12), wherein the estimate of the one or more of the plurality of target positions is based on a determined relative position or a determined relative orientation of at least one portion of a body part of each of the plurality of users.

(14)

The apparatus according to any of (1) to (13), wherein the relative position or the relative orientation of the at least one portion of each user's body part is determined using the at least one imaging sensor at a plurality of points during a detected gesture of the user's body part.

(15)

The apparatus according to any of (1) to (14), wherein the reliability of the estimate of the one or more of the plurality of target positions is based on an amount of data for each target position related to the relative position or the relative orientation of the at least one portion of each user's body part, and the width of a particular region of the at least one sound collection region decreases as the reliability of the estimate of a particular target position of the plurality of target positions increases.

(16)

The apparatus according to any of (1) to (15), wherein the circuitry is further configured to display visual information indicating the control of the acquisition condition.

(17)

The apparatus according to any of (1) to (16), wherein visual information indicating control of the acquisition condition is based on the reliability of the estimate of the one or more of the plurality of target positions.

(18)

The apparatus according to any of (1) to (17), wherein the circuitry is further configured to determine whether the detected body part is on a left side or a right side of a user.

(19)

An information processing method, performed via at least one processor, the method including:
  determining a position of a mouth of a user that is distinguishable among a plurality of people, and
  controlling an acquisition condition for collecting a sound based on the determined position of the user's mouth.

(20)

A non-transitory computer-readable medium having embodied thereon a program, which when executed by a computer causes the computer to execute a method, the method including:
  determining a position of a mouth of a user that is distinguishable among a plurality of people, and
  controlling an acquisition condition for collecting a sound based on the determined position of the user's mouth.

(21)

An information processing apparatus, including:
  an estimation unit which estimates, based on a change in a first portion of at least a part of a user's limbs along a time series of position information showing at least one of a position and an orientation, a position of a second portion of at least a part of the user's body trunk.

(22)

The information processing apparatus according to (21), further including:
  a directivity control unit which controls a directivity of a prescribed device based on an estimation result of a position of the second portion.

(23)

The information processing apparatus according to (22),
  wherein the prescribed device is a sound collection device,
  wherein the information processing apparatus further includes a voice recognition unit which recognizes a voice collected by the sound collection device, and
  wherein the voice recognition unit recognizes a speaker of the recognized voice is the user for whom a position of the second portion has been estimated.

(24)

The information processing apparatus according to (23),
  wherein the estimation unit estimates a position of the user's mouth as the second portion, and
  wherein the directivity control unit controls a directivity of the sound collection device so the sound collection device faces a direction of the mouth.

(25)

The information processing apparatus according to (22),
  wherein the prescribed device is an imaging device which captures an image of a photographic subject,
  wherein the estimation unit estimates a position of a portion of at least a part of the user's face as the second portion, and
  wherein the directivity control unit controls an orientation of the imaging device so the imaging device faces a direction of a portion of the part.

(26)

The information processing apparatus according to any one of (22) to (25),
  wherein the directivity control unit controls a directivity of the prescribed device based on a reliability of an estimation result of a position of the second portion.

(27)

The information processing apparatus according to any one of (21) to (26), further including:
  an output control unit which causes a prescribed output unit to output information showing a reliability of an estimation result of a position of the second portion.

(28)

The information processing apparatus according to any one of (21) to (27),
  wherein the estimation unit estimates a position of the second portion based on a change along a time series of the position information of the first portion having at least two degrees of freedom as a degree of freedom of movement.

(29)

The information processing apparatus according to any one of (21) to (27),
  wherein the estimation unit estimates a position of the second portion based on a change along a time series of the position information of the first portion with a movable range of a prescribed width or more.

(30)

The information processing apparatus according to any one of (21) to (27), further including:
a detection unit which detects the position information of the first portion.

(31)

The information processing apparatus according to (30), wherein the detection unit detects a distance to the user, and
wherein the estimation unit calculates the position information of the first portion based on a detection result of a plurality of the distances.

(32)

The information processing apparatus according to (31), wherein the estimation unit calculates the position information of the first portion by applying a principal component analysis to a detection result of the plurality of distances.

(33)

The information processing apparatus according to any one of (21) to (32),
wherein the first portion is a portion of at least a part of the user's arm.

(34)

The information processing apparatus according to (33), wherein the estimation unit estimates whether the first portion corresponds to either of a right arm and a left arm.

(35)

The information processing apparatus according to (34), wherein the estimation unit estimates whether the first portion corresponds to either of a right arm and a left arm based on a change in a speed or acceleration of the first portion.

(36)

The information processing apparatus according to (34), wherein the estimation unit estimates whether the first portion corresponds to either of a right arm and a left arm based on a movable range of the first portion.

(37)

The information processing apparatus according to any one of (21) to (36),
wherein the estimation unit estimates a position of the second portion based on a track of movement of the first portion.

(38)

An information processing method, including:
estimating, by a processor, based on a change in a first portion of at least a part of a user's limbs along a time series of position information showing at least one of a position and an orientation, a position of a second portion of at least a part of the user's body trunk.

(39)

A program for causing a computer to execute:
estimating, based on a change in a first portion of at least a part of a user's limbs along a time series of position information showing at least one of a position and an orientation, a position of a second portion of at least a part of the user's body trunk.

REFERENCE SIGNS LIST 1 information processing apparatus
10 main body
11 control unit
12 target recognition unit
13 voice recognition unit
14 target world model update unit
15 directivity control unit
16 input analysis unit
17 processing execution unit
18 output control unit
20 sensor box
21 detection unit
23 sound collection unit
30 output unit
40 storage unit

The invention claimed is:

1. An apparatus, comprising:
circuitry configured to
control at least one imaging sensor to determine a position of a mouth of each user that is distinguishable among a plurality of people,
determine a reliability of the determined position of each user's mouth based on information obtained by the at least one imaging sensor,
control an acquisition condition for collecting a sound based on the determined position of each user's mouth and the determined reliability of the determined position of each user's mouth, and
collect the sound using at least one sound sensor according to the controlled acquisition condition,
wherein each sound sensor of the at least one sound sensor is located in a predetermined position, and
wherein the acquisition condition comprises orientation and width of a sound collection region for each sound sensor of the at least one sound sensor.

2. The apparatus according to claim 1,
wherein the circuitry is further configured to:
detect a body part of each user performing a gesture; and
determine a relative position or a relative orientation of at least one portion of each user's body part at a plurality of points during the gesture,
wherein the position of each user's mouth is determined as an estimate based on the determined relative position or the determined relative orientation of the at least one portion of each user's body part.

3. The apparatus according to claim 2, wherein the detected body part comprises an arm of each user and the at least one portion of each user's body part comprises one or more of a hand, a forearm, an elbow, and a shoulder of the user.

4. The apparatus according to claim 3, wherein the relative position or the relative orientation of the at least one portion of each user's body part is determined based on the relative position or the relative orientation of another one of the at least one portion of each user's body part.

5. The apparatus according to claim 2, wherein the circuitry is further configured to determine whether the detected body part is on a left side or a right side of each user.

6. The apparatus according to claim 1, wherein the determined position of each user's mouth is set to be a target position of sound collection, such that the orientation of the at least one sound collection region is directed toward each target position.

7. The apparatus according to claim 1, wherein the circuitry is further configured to determine the position of the mouth of each user of a plurality of users distinguishable among the plurality of people.

8. The apparatus according to claim 7, wherein the determined position of each mouth of the plurality of users is set to be a target position of sound collection, such that the orientation of each sound collection region is directed toward one of the plurality of target positions.

9. The apparatus according to claim 8, wherein a number of sound sensors is equal to or greater than a number of the plurality of users.

10. The apparatus according to claim 8, wherein each sound sensor collects sound within the orientation and the width of the sound collection region directed toward one of the plurality of target positions.

11. The apparatus according to claim 10, wherein an estimate of the plurality of target positions is based on a determined relative position or a determined relative orientation of at least one portion of a body part of each user of the plurality of users.

12. The apparatus according to claim 11, wherein the relative position or the relative orientation of the at least one portion of each user's body part is determined using the at least one imaging sensor at a plurality of points during a detected gesture of the user's body part.

13. The apparatus according to claim 12, wherein the determined reliability of the determined position of each user's mouth is based on an amount of data for each target position related to the relative position or the relative orientation of the at least one portion of each user's body part, and the width of a particular sound collection region decreases as the reliability of the estimate of a particular target position of the plurality of target positions increases.

14. The apparatus according to claim 1, wherein the circuitry is further configured to control a display device to display visual information indicating the control of the acquisition condition.

15. The apparatus according to claim 14, wherein the displayed visual information indicating the control of the acquisition condition is based on the determined reliability of the determined position of each user's mouth.

16. The apparatus according to claim 14,
wherein a size of the displayed visual information is controlled according to the determined reliability of the determined position of each user's mouth.

17. The apparatus according to claim 1,
wherein each imaging sensor of the at least one imaging sensor is located in the predetermined position of a respective sound sensor of the at least one sound sensor.

18. An information processing method, performed via at least one processor, the method comprising:
controlling at least one imaging sensor to determine a position of a mouth of each user that is distinguishable among a plurality of people;
determining a reliability of the determined position of each user's mouth based on information obtained by the at least one imaging sensor;
controlling an acquisition condition for collecting a sound based on the determined position of each user's mouth and the determined reliability of the determined position of each user's mouth; and
collecting the sound using at least one sound sensor according to the controlled acquisition condition,
wherein each sound sensor of the at least one sound sensor is located in a predetermined position, and
wherein the acquisition condition comprises orientation and width of a sound collection region for each sound sensor of the at least one sound sensor.

19. A non-transitory computer-readable medium having embodied thereon a program, which when executed by a computer causes the computer to execute a method, the method comprising:
controlling at least one imaging sensor to determine a position of a mouth of each user that is distinguishable among a plurality of people;
determining a reliability of the determined position of each user's mouth based on information obtained by the at least one imaging sensor;
controlling an acquisition condition for collecting a sound based on the determined position of each user's mouth and the determined reliability of the determined position of each user's mouth; and
collecting the sound using at least one sound sensor according to the controlled acquisition condition,
wherein each sound sensor of the at least one sound sensor is located in a predetermined position, and
wherein the acquisition condition comprises orientation and width of a sound collection region for each sound sensor of the at least one sound sensor.

* * * * *